United States Patent
Chadwick et al.

(10) Patent No.: US 6,243,036 B1
(45) Date of Patent: Jun. 5, 2001

(54) SIGNAL PROCESSING FOR OBJECT DETECTION SYSTEM

(75) Inventors: George G. Chadwick, Menlo Park; Thomas C. Weakley, Los Gatos, both of CA (US)

(73) Assignee: MacAleese Companies, Inc., Albuquerque, NM (US)

( * ) Notice: Subject to any disclaimer, the term of this patent is extended or adjusted under 35 U.S.C. 154(b) by 0 days.

(21) Appl. No.: 09/346,857

(22) Filed: Jul. 2, 1999

Related U.S. Application Data

(63) Continuation-in-part of application No. 09/318,196, filed on May 25, 1999.

(51) Int. Cl.[7] .................................................. G01S 13/88
(52) U.S. Cl. ........................ 342/27; 342/175; 342/188; 342/192; 342/193; 342/194; 342/195; 342/196
(58) Field of Search ................................. 342/22, 27, 52, 342/53–55, 175, 192–197, 61, 179, 188, 189

(56) References Cited

U.S. PATENT DOCUMENTS

| | | |
|---|---|---|
| 3,500,395 | 3/1970 | Foster et al. . |
| 3,599,211 | 8/1971 | Mardon . |
| 3,669,038 | 6/1972 | Watson . |
| 3,707,672 | 12/1972 | Miller et al. . |
| 3,713,156 | 1/1973 | Pothier . |
| 3,911,435 | 10/1975 | Mardon et al. . |
| 3,924,546 | 12/1975 | Pretini . |
| 4,064,458 | 12/1977 | De Loach, Jr. . |
| 4,122,783 | 10/1978 | Pretini . |
| 4,341,165 | 7/1982 | Calandritti et al. . |
| 4,461,221 | 7/1984 | Schandle et al. . |
| 4,481,887 | 11/1984 | Urbano . |
| 4,586,441 | 5/1986 | Zekich . |
| 4,656,954 | 4/1987 | Tonali . |

(List continued on next page.)

FOREIGN PATENT DOCUMENTS

| | | |
|---|---|---|
| WO 96/19737 | 6/1996 | (WO) . |
| WO 97/01771 | 1/1997 | (WO) . |

OTHER PUBLICATIONS

Reber, E.E., et al., "Evaluation of Active and Passive Near–Millimeter–Wave Radiometric Imaging Techniques for Detection of Concealed Object," *Aerospace Report No. ATR–80(7843)–2*, Sandia Laboratories, Albuquerque, New Mexico 87115, Contact No. 13–90245 (Mar. 20, 1981).

Abbott, G.F., "Personal Surveillance System," *IBM Technical Disclosure Bulletin*, vol. 12, No. 7 (Dec. 1969) pp. 1119–20.

Abbott, G.F. "Personal Serveillance System" IBM Tech. Discl. Bulletin, vol. 12, No. 7, Dec., 1969. pp. 1119–1120.

(List continued on next page.)

*Primary Examiner*—Bernarr E. Gregory
(74) *Attorney, Agent, or Firm*—Peacock, Myers & Adams PC

(57) ABSTRACT

Methods and apparatus for detecting objects are disclosed. In one embodiment of the invention, a person entering a secured or "Safe Zone™" is illuminated with low-power polarized radio waves. Differently polarized waves which are reflected back from the person are collected and measured. In a preferred embodiment of the invention, concealed weapons are detected by calculating the difference of a pair of differences between levels of different polarized reflected energy in the time domain, and by using signal processing methods and apparatus to improve the reliability of the detection process. Alternative embodiments of the invention may be used to detect a wide variety of objects other than concealed firearms. The invention may be used for inventory control or to thwart shoplifting.

20 Claims, 34 Drawing Sheets

U.S. PATENT DOCUMENTS

| | | | |
|---|---|---|---|
| 4,675,677 | 6/1987 | Von Maydell et al. | 342/25 |
| 4,706,031 | 11/1987 | Michiguchi et al. . | |
| 4,905,008 | 2/1990 | Kawano et al. | 342/22 |
| 4,951,058 * | 8/1990 | Schriner et al. | 342/61 |
| 5,039,981 | 8/1991 | Rodriguez . | |
| 5,073,782 * | 12/1991 | Huguenin et al. | 342/179 |
| 5,081,456 * | 1/1992 | Michiguchi et al. | 342/22 |
| 5,195,448 | 3/1993 | Sims . | |
| 5,222,155 | 6/1993 | Delanoy et al. . | |
| 5,227,800 | 7/1993 | Huguenin | 342/179 |
| 5,311,166 | 5/1994 | Frye . | |
| 5,334,981 | 8/1994 | Smith et al. | 342/27 |
| 5,337,053 | 8/1994 | Dwyer | 342/90 |
| 5,345,240 | 9/1994 | Frazier | 342/28 |
| 5,365,237 | 11/1994 | Johnson et al. | 342/179 |
| 5,381,153 | 1/1995 | Saito et al. | 342/70 |
| 5,408,414 | 4/1995 | Nomoto et al. . | |
| 5,446,461 | 8/1995 | Frazier | 342/22 |
| 5,455,590 | 10/1995 | Collins et al. | 342/179 |
| 5,457,394 | 10/1995 | McEwan . | |
| 5,512,834 | 4/1996 | McEwan . | |
| 5,517,429 | 5/1996 | Harrison . | |
| 5,519,400 | 5/1996 | McEwan | 342/28 |
| 5,552,705 | 9/1996 | Keller . | |
| 5,552,766 | 9/1996 | Lee et al. . | |
| 5,557,283 | 9/1996 | Sheen et al. | 342/179 |
| 5,576,972 | 11/1996 | Harrison . | |
| 5,598,152 | 1/1997 | Scarzello et al. . | |
| 5,644,314 | 7/1997 | Ahmad et al. | 342/22 |
| 5,673,050 | 9/1997 | Moussally et al. | 342/22 |
| 5,692,446 | 12/1997 | Becker et al. . | |
| 5,694,498 | 12/1997 | Manasson et al. . | |
| 5,694,867 | 12/1997 | Diaz-Lopez . | |
| 5,706,402 | 1/1998 | Bell . | |
| 5,774,357 | 6/1998 | Hoffberg et al. . | |

OTHER PUBLICATIONS

Bhanu, B. "Guest Editorial: Introduction to the Special Issue on Automatic Target Detection and Recognition" IEEE Transactions on Image Processing, vol. 6, No. 1, Jan., 1997. pp. 1–6.

McMakin, D.L. et al. "Remote Concealed Weapons and Explosive Detection on People Using Millimeter–wave Holography" 1996 IEEE. pp. 19–25.

McMillan, R.W. et al. "Concealed Weapon Detection Using Microwave and Millimeter Wave Sensors" 1998 IEEE. pp. 1–4.

Murray, N.C. et al. "Exploitation of X–Ray Technology for the Detection of Contraband—Aviation Security Applications" European Conf. on Sec. and Detection Apr. 28–30, 1997, Conf. Publ. No. 437. pp. 13–18.

Reber, E.E. et al. "Final Report: Evaluation of Active and Passive Near–Millimeter–Wave Radiometric Imaging Techniques for Detection of Concealed Objects" Aerospace Report No. ATR–80(7843)–2, Mar. 20, 1981. pp. 1–29.

Varshney, P.K. et al. "On the Modeling of the Sensor Fusion Process for Concealed Weapons Detection" 1998 IEEE. p 14.

* cited by examiner

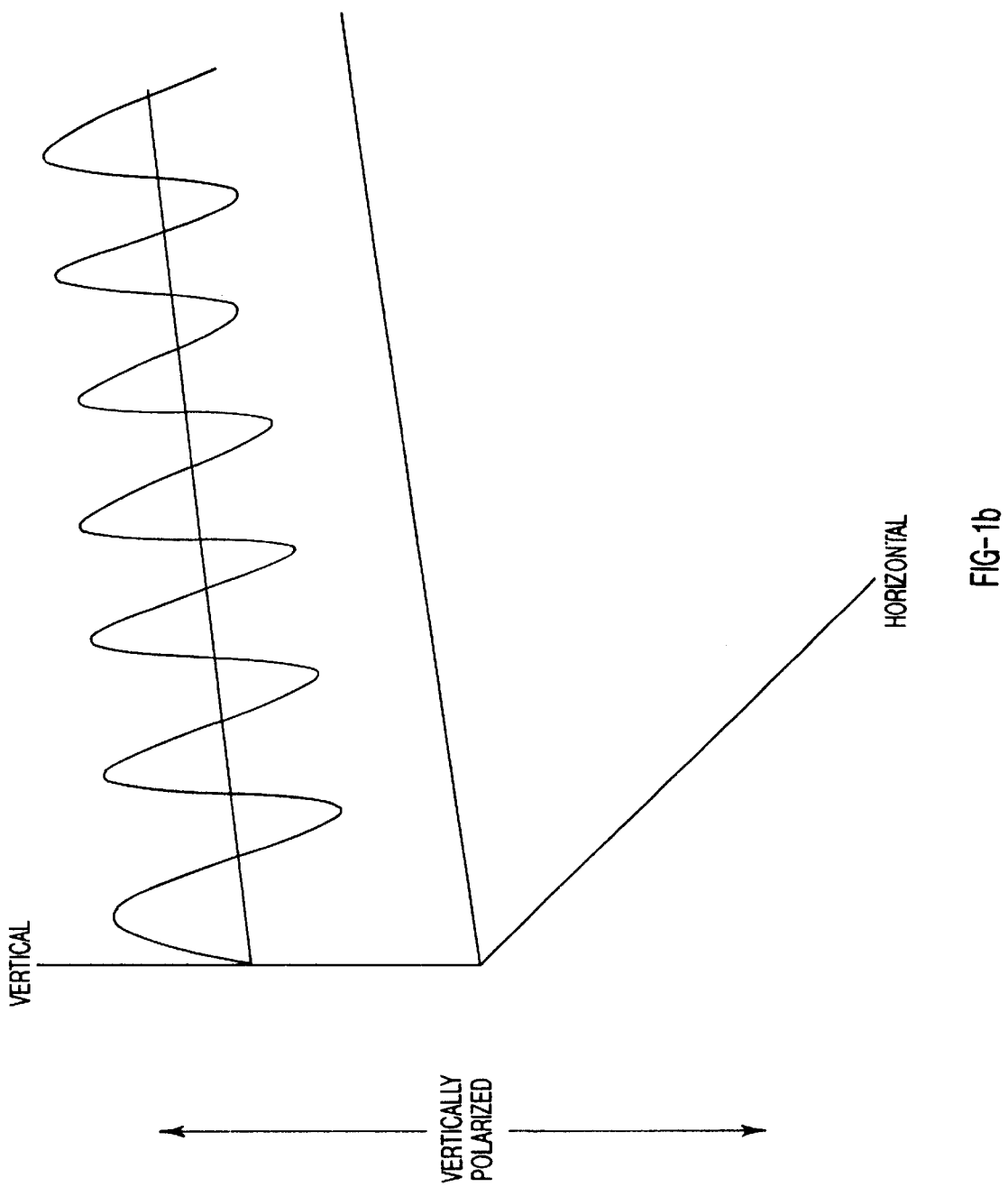

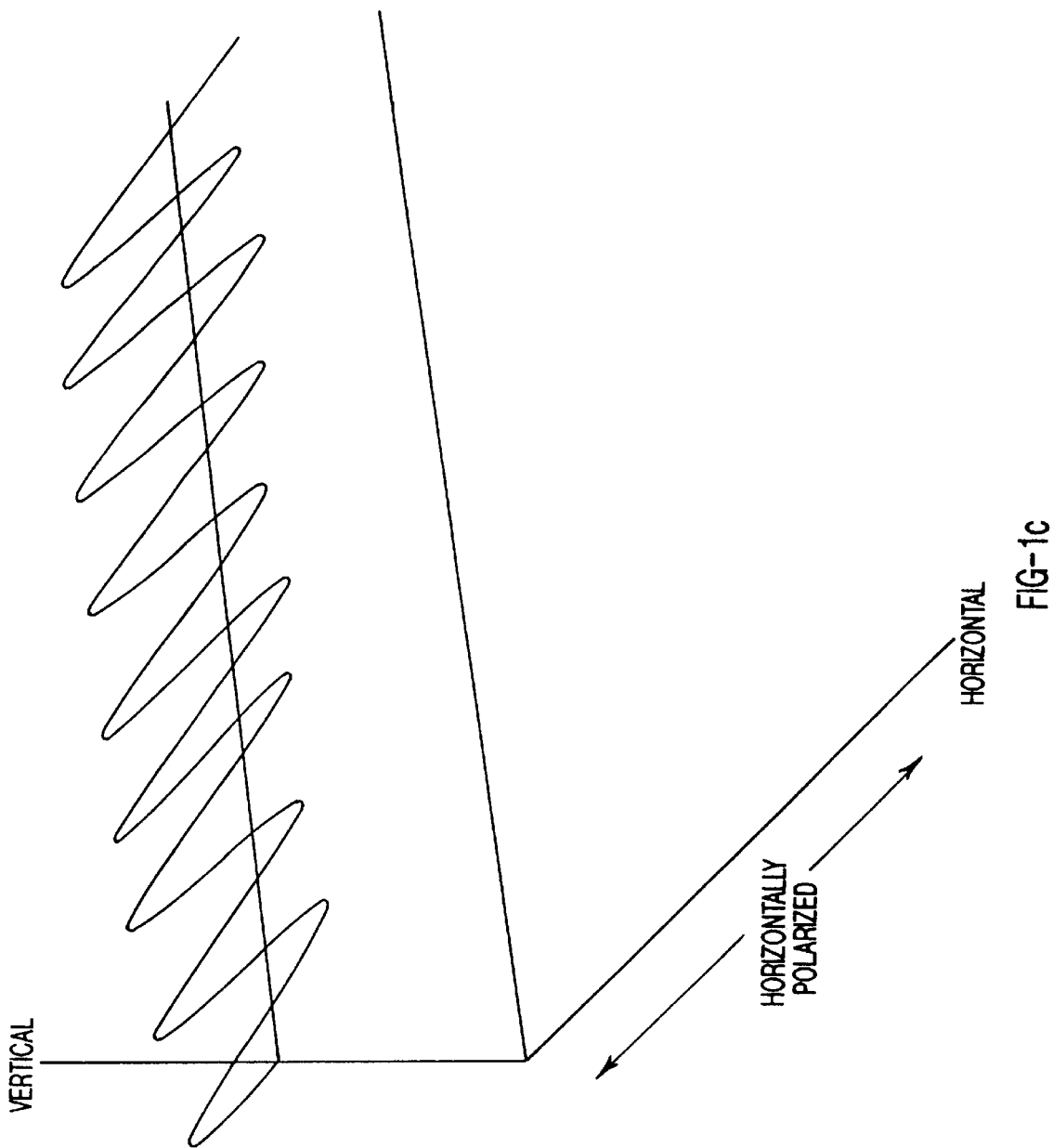

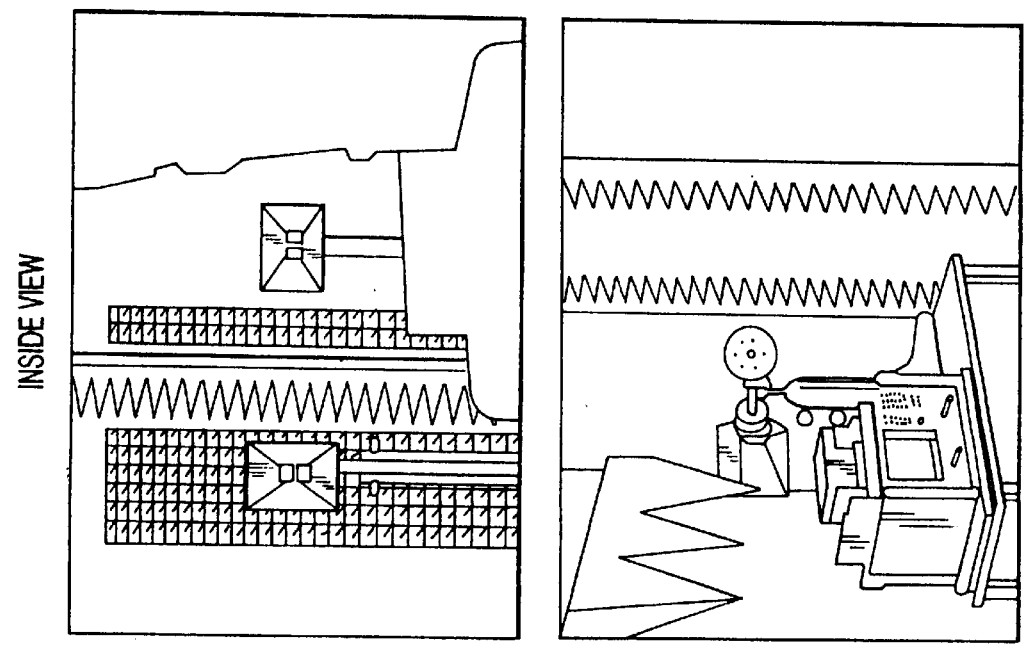
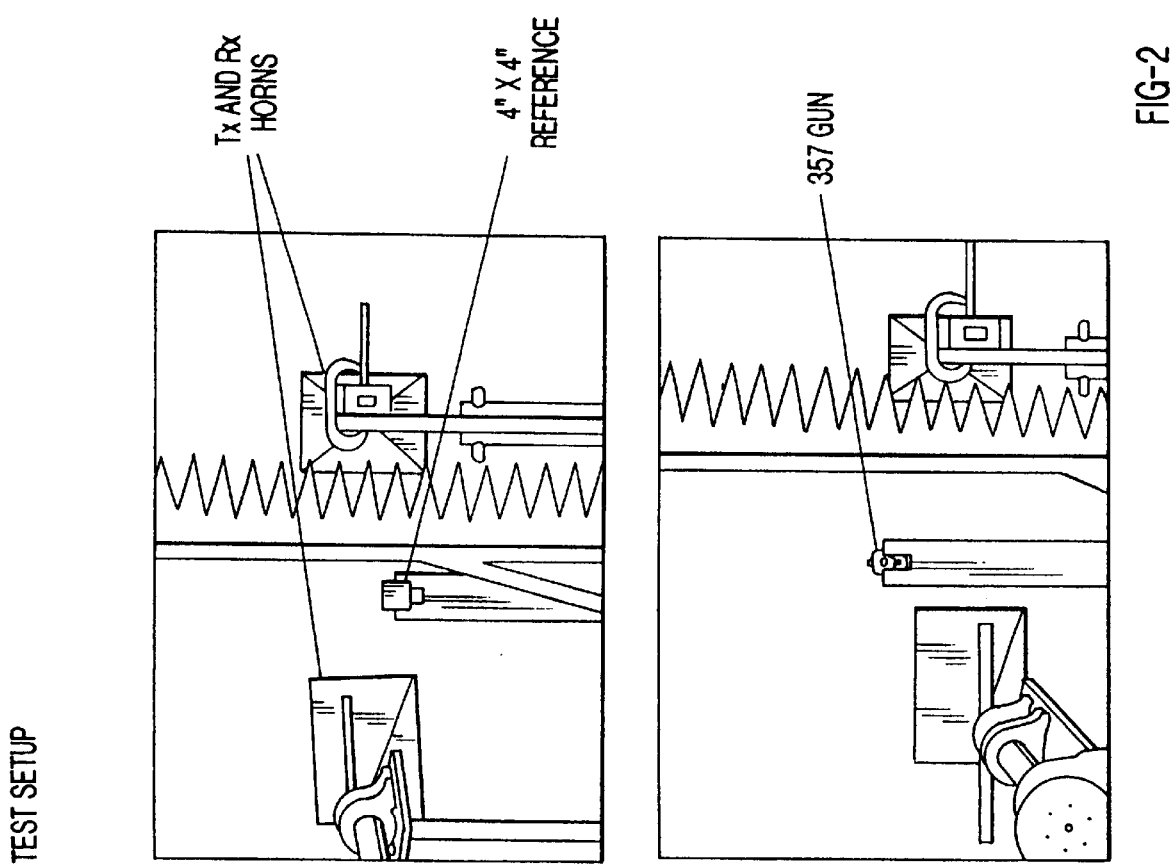
FIG-2

WHAT IS dBsm?

- IF THE GAIN IS 1 OR 0 dB
  - 1" X 1" = −31.9 dBsm
  - 3" X 3" = −22.4 dBsm
  - 6" X 6" = −16.4 dBsm
- AT 1 GHz FOR A 6" X 6" PLATE, THE GAIN IS 5.1 dB
- 6" X 6" PLATE AT 1 GHz = −16.4 + 5.1 = −11.3 dB
- FOR FLAT SURFACES THE GAIN INCREASES AS 20 LOG (f) WHERE f IS IN GHz AND THE RESULT IS IN dB

FIG-5

357 REFERENCE RCS MEASUREMENTS

- 357 RADAR CROSS SECTION MEASURED
  - 500 – 1000 MHz            −15 dBsm
  - 1000 – 1750 MHz
  - 2650 – 3000 MHz           −10 dBsm
  - 2890 – 3250 MHz
  - 9500 – 10660 MHz
- TEST CONFIGURATION
  - ONE PORT RCS MEASUREMENT
  - 16 AVERAGES
  - TIME DOMAIN GATING
  - REDUCED IF BANDWIDTH

FIG-6

9.5 TO 10.6 GHz

- TWO TEST SUBJECTS USED
  - GEORGE CHADWICK
  - CRAIG WEAKLEY
- TRANSMIT VERTICAL, RECEIVE HORIZONTAL ONLY (NO CO-POLE IN THIS SET)

|  | FRONT | SIDE | BACK |
|---|---|---|---|
| GEORGE | −3.5 dB | 12 dB | 13 dB |
| CRAIG | 8 dB | 5 dB | 4 dB |

- 5 OUT OF 6 CASES WERE POSITIVE. BEST RESULTS TO DATE

NOTE:
- NUMBERS GIVEN ARE DELTAS BETWEEN CROSS-POLE LEVELS, (GUN LEVEL/NO GUN LEVEL)
- POSITIVE MEANS GUN IS GREATER

FIG-11

2.9 TO 3.25 GHz

DATA SUMARY--5 MAY/99 DATA--2.9 TO 3.25 GHz
ALL FIGURES IN dB; HORIZONTAL Tx FOR ALL CASES;

FRONT

| | MAIN/NO GUN | X NO GUN | MAIN-GUN: | X GUN | NO GUN D | GUN D | MARGIN | MARGIN AVG | MAIN D |
|---|---|---|---|---|---|---|---|---|---|
| KEVIN | -41.0 | -70.6 | -49.7 | -57.6 | 29.6 | 7.9 | 21.7 | 15.2 | 8.7 |
| ROKKI | -51.0 | -66.5 | -45.7 | -64.0 | 15.5 | 18.3 | -2.8 | 4.8 | -5.3 |
| CRAIG | -41.4 | -70.6 | -39.8 | -64.1 | 29.2 | 24.3 | 4.9 | -1.3 | -1.6 |
| GEORGE | -51.0 | -68.9 | -55.7 | -54.9 | 17.9 | -0.8 | 18.7 | 23.9 | 4.7 |
| | | | | AVERAGE | 23.1 | | | | |

SIDE

| | MAIN/NO GUN | X NO GUN | MAIN-GUN: | X GUN | NO GUN D | GUN D | MARGIN | MARGIN AVG | MAIN D |
|---|---|---|---|---|---|---|---|---|---|
| KEVIN | -43.6 | -68.4 | -48.1 | -64.8 | 24.8 | 16.7 | 8.1 | 7.8 | 4.5 |
| ROKKI | -44.7 | -76.6 | -52.0 | -68.0 | 31.9 | 16.0 | 15.9 | 8.5 | 7.3 |
| CRAIG | -53.4 | -68.1 | -60.5 | -63.7 | 14.7 | 3.2 | 11.5 | 21.3 | 7.1 |
| GEORGE | -41.3 | -67.7 | -38.9 | -52.8 | 26.4 | 13.9 | 12.5 | 10.6 | -2.4 |
| | | | | AVERAGE | 24.5 | | | | |

BACK

| | MAIN/NO GUN | X NO GUN | MAIN-GUN: | X GUN | NO GUN D | GUN D | MARGIN | MARGIN AVG | MAIN D |
|---|---|---|---|---|---|---|---|---|---|
| KEVIN | -42.0 | -61.1 | -45.0 | -63.8 | 19.1 | 18.8 | 0.3 | 6.0 | 3.0 |
| ROKKI | -36.3 | -79.9 | -46.7 | -57.4 | 43.6 | 10.7 | 32.9 | 14.1 | 10.4 |
| CRAIG | -38.8 | -71.5 | -38.4 | -52.0 | 32.7 | 13.6 | 19.1 | 11.2 | -0.4 |
| GEORGE | -55.0 | -58.9 | -42.5 | -56.8 | 3.9 | 14.3 | -10.4 | 10.5 | -12.5 |
| | | | | AVERAGE | 24.8 | | | | |

FIG-12

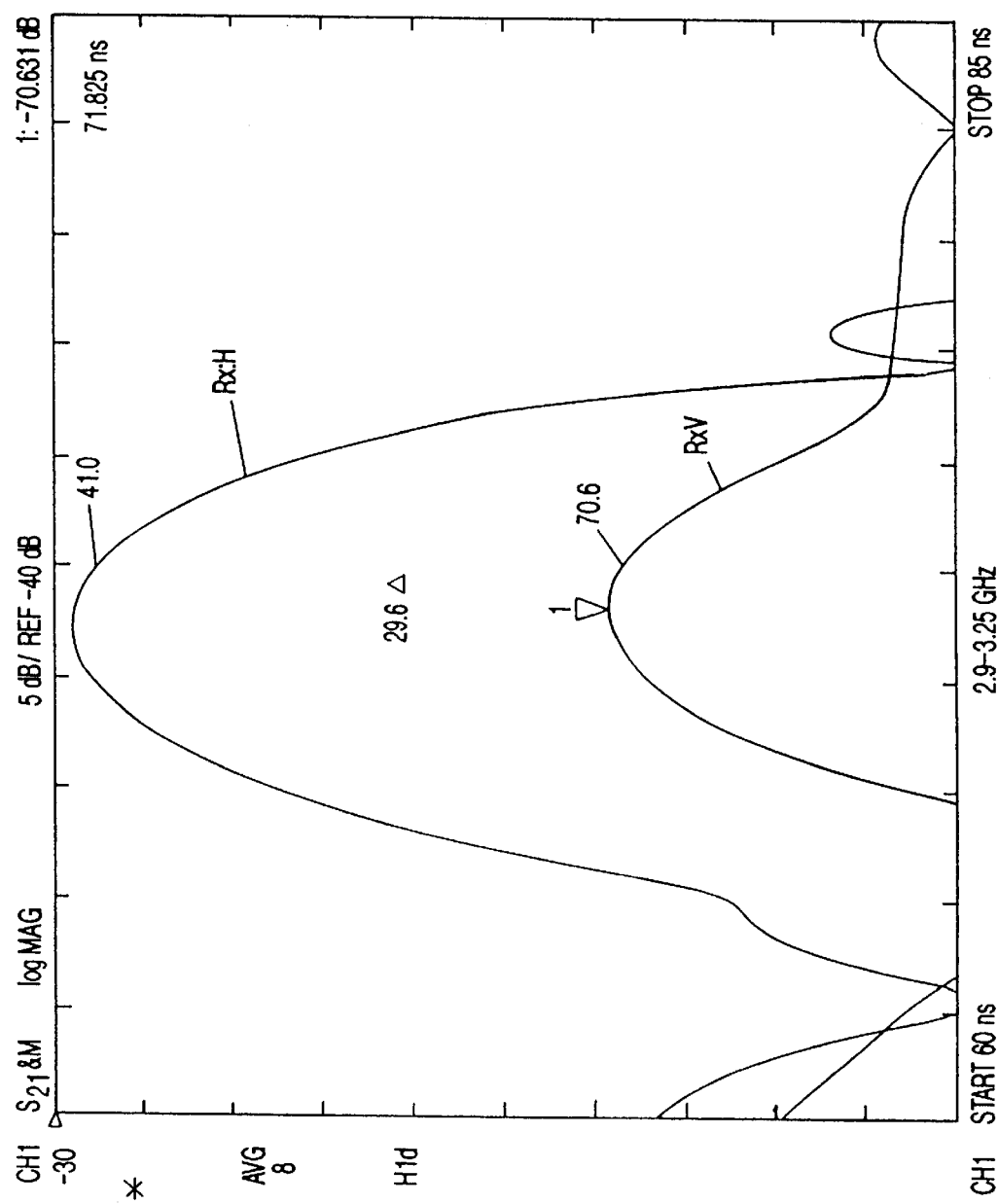

2.9 TO 3.25 GHz – SUMMARY FRONT CASES

| | FRONT | | | | | | FALSE ALARM | | |
|---|---|---|---|---|---|---|---|---|---|
| | MAIN/NO GUN | X/NO GUN | MAIN-GUN | X GUN | NO GUN D | GUN D | MARGIN | XG-XNGg AVE. | XNG-XNG AVE | NGD-NGD AVE | NOTE# |
| ZOLT | -42.5 | -65.7 | -40.7 | -62.9 | 23.2 | 22.2 | 1.4 | 4.7 | 1.9 | 2.4 | 1 |
| ROKKI | -43.0 | -72.8 | -39.8 | -56.4 | 29.8 | 16.6 | 4.2 | 11.2 | -5.2 | 9.0 | 2 |
| ROKKI | -48.7 | -71.2 | -46.9 | -63.6 | 22.5 | 16.7 | 4.1 | 4.0 | -3.6 | 1.7 | 2 |
| ROKKI | -50.7 | -72.0 | -49.1 | -59.0 | 21.3 | 9.9 | 10.9 | 8.6 | -4.4 | 0.5 | 2 |
| ROKKI | -43.2 | -67.1 | -49.1 | -59.0 | 23.9 | 9.9 | 10.9 | 8.6 | 0.5 | 3.1 | 2 |
| ROKKI | -40.1 | -72.4 | -39.4 | -64.7 | 32.3 | 25.3 | -4.5 | 2.9 | -4.8 | 11.5 | 4 |
| ROKKI | -43.3 | -65.1 | -45.3 | -67.3 | 21.8 | 22.0 | -1.2 | 0.3 | 1.0 | 5 |
| ROKKI | -46.6 | -73.0 | -41.3 | -62.0 | 26.4 | 20.7 | 0.1 | 5.6 | 2.5 | 5.6 | 2 |
| ZOLT | -41.5 | -58.0 | -41.9 | -64.8 | 16.5 | 22.9 | -2.1 | 2.8 | -5.4 | -4.3 | 8 |
| DEAN | -39.3 | -58.4 | -42.4 | -58.0 | 19.1 | 15.6 | 5.2 | 9.6 | 9.6 | -1.7 | 6 |
| ROKKI | -50.6 | -53.8 | -48.7 | -52.5 | 3.2 | 3.8 | 17.0 | 15.1 | 13.8 | -17.6 | 7 |
| AVERAGES | -45.0 | -67.6 | -44.5 | -61.8 | 20.8 | 16.0 | | | | | |
| | | | | | | | RULE A | TEST B | TEST C | |

MAIN POLARIZATIONS ARE ABOUT THE SAME LEVEL -WITHIN 0.5 dB ON THE AVERAGE
GUN X POLARIZATION IS ABOUT 6 dB HIGHER THAN THE NO GUN CROSS- ON THE AVERAGE.
GUN DIFFERENCE IS ABOUT 5 dB HIGHER THAN THE NO GUN DIFFERENCE- ON THE AVERAGE
RULE A GIVES 100% DETECTION.
TESTS B AND C GIVE A 3/11 OR 27% FALSE ALARM RATE.

1 ZOLT     MALE     5' 11"     180 lbs
2 ROKKI     FEMALE     5' 6"     145 lbs
3 KEYS AND CELL NEXTEL PHONE IN EACH POCKET
4 LEATHER JACKET-NO ZIPPER
5 SPORTS COAT-NO SIDE UNIT
6 DEAN     MALE     6' 1"     220 lbs
7 LEATHER JACKET WITH ZIPPER-CAUGHT BY SIDE UNIT
8 CAUGHT BY SIDE UNIT

NULLED
NULLED

IF RULE A IS POSITIVE, THEN WE HAVE GUN.
IF TEST B AND C ARE BOTH POSITIVE WE HAVE A FALSE ALARM.

FIG-15

2.9 TO 3.25 GHz – SUMMARY SIDE CASES

| | SIDE | | | | NO GUN D | GUN D | MARGIN | FALSE ALARM | | | NOTE # |
|---|---|---|---|---|---|---|---|---|---|---|---|
| | MAIN/NO GUN | X NO GUN | MAIN-GUN | X GUN | | | | XG-XNG GAVE | XNG-XNG AVE | NGD-NGD AVE | |
| ZOLT | -39.0 | -56.4 | -46.7 | -55.1 | 17.4 | 8.4 | 14.6 | 12.5 | 11.2 | -5.6 | 1 |
| ROKKI | -44.3 | -67.9 | -40.3 | -66.9 | 23.6 | 26.6 | -3.6 | 0.7 | -0.3 | 0.6 | 2 |
| ROKKI | -45.1 | -65.9 | -39.9 | -63.1 | 20.8 | 23.2 | -0.2 | 4.5 | 1.7 | -2.2 | 2 |
| ROKKI | -43.2 | -75.1 | -49.7 | -66.7 | 31.9 | 17.0 | 6.0 | 0.9 | -7.5 | 8.9 | 2 |
| ROKKI | -42.0 | -74.8 | -49.7 | -66.7 | 32.8 | 17.0 | 6.0 | 0.9 | -7.2 | 9.8 | 3 |
| ROKKI | -44.5 | -75.6 | -43.4 | -68.1 | 31.1 | 24.7 | -1.7 | -0.5 | -8.0 | 8.1 | 4 |
| ROKKI | -44.7 | -74.7 | -43.7 | -60.5 | 30.0 | 16.8 | 6.2 | 7.1 | -7.1 | 7.0 | 5 |
| ROKKI | -42.2 | -62.0 | -54.0 | -60.0 | 19.8 | 6.0 | 17.0 | 7.6 | 5.6 | -3.2 | 2 |
| ZOLT | -45.1 | -65.9 | -30.9 | -63.1 | 20.8 | 32.2 | -9.2 | 4.5 | 1.7 | -2.2 | 8 |
| DEAN | -40.0 | -57.9 | -40.5 | -56.6 | 17.9 | 16.1 | 6.9 | 11.0 | 9.7 | -5.1 | 6 |
| ROKKI | -38.7 | -55.0 | -45.0 | -53.0 | 16.3 | 8.0 | 15.0 | 14.6 | 12.6 | -6.7 | 7 |
| AVERAGES | -43.0 | -67.6 | -45.3 | -62.7 | 23.0 | 16.4 | | | | | |
| | | | | | | | | RULE A | TEST B | TEST C | |
| | | | | | | | | | NULLED | NULLED | |

MAIN POLARIZATIONS ARE ABOUT THE SAME LEVEL -- WITHIN 2.3 dB ON THE AVERAGE.
GUN X POLARIZATION IS ABOUT 5 dB HIGHER THAN THE NO GUN CROSS -- ON THE AVERAGE.
GUN DIFFERENCE IS ABOUT 6.6 dB HIGHER THAN THE NO GUN DIFFERENCE -- ON THE AVERAGE.
RULE A GIVES 100% DETECTION.
TESTS B AND C GIVE NO FALSE ALARM RATE.

NOTES

1 ZOLT                  MALE      5' 11"       180 lbs
2 ROKKI                 FEMALE    5' 6"        145 lbs
3 KEYS AND CELL NEXTEL PHONE IN EACH POCKET
4 LEATHER JACKET -- NO ZIPPER
5 SPORTS COAT -- NO SIDE UNIT
6 DEAN                  MALE      6' 1"        220 lbs
7 LEATHER JACKET WITH ZIPPER -- CAUGHT BY SIDE UNIT
8 CAUGHT BY SIDE UNIT IF RULE A IS GREATER THAN -1 dB, THEN WE HAVE A GUN.
IF TEST B AND C ARE BOTH POSITIVE WE HAVE A FALSE ALARM.

FIG-16

2.9 TO 3.25 GHz - SUMMARY BACK CASES

| | BACK | | | | | | | FALSE ALARM | | |
|---|---|---|---|---|---|---|---|---|---|---|
| | MAIN/NO GUN | X NO GUN | MAIN GUN | X GUN | NO GUN D | GUN D | MARGIN | XG-XNG GAVE | XNG-XNG AVE | NGD-NGD AVE | NOTE # |
| ZOLT | -45.5 | -69.1 | -46.9 | -60.6 | 23.6 | 13.7 | 12.1 | 0.7 | -7.8 | -2.2 | 1 |
| ROKKI | -37.9 | -63.8 | -43.4 | -57.9 | 25.9 | 14.5 | 11.3 | 3.4 | -2.5 | 0.1 | 2 |
| ROKKI | -35.4 | -66.4 | -47.2 | -60.8 | 31.0 | 13.6 | 12.2 | 0.5 | -5.1 | 5.2 | 2 |
| ROKKI | -35.6 | -70.6 | -43.2 | -60.3 | 35.0 | 17.1 | 8.7 | 1.0 | -9.3 | 9.2 | 2 |
| ROKKI | -36.8 | -69.1 | -43.2 | -60.3 | 32.3 | 17.1 | 8.7 | 1.0 | -7.8 | 6.5 | 2 |
| ROKKI | -35.1 | -65.5 | -36.5 | -66.9 | 30.4 | 30.4 | -4.6 | -5.6 | -4.2 | 4.6 | 9 |
| ROKKI | -38.5 | -68.0 | -42.5 | -61.0 | 29.5 | 18.5 | 7.3 | 0.3 | -6.7 | 3.7 | 4 |
| ROKKI | -35.0 | -64.0 | -47.0 | -53.6 | 29.0 | 6.6 | 19.2 | 7.7 | -2.7 | 3.2 | 5 |
| ZOLT | -39.0 | -65.0 | -43.3 | -61.6 | 26.0 | 18.3 | 7.5 | -0.3 | -3.7 | 0.2 | 1 |
| DEAN | -35.0 | -57.3 | -33.5 | -56.8 | 22.3 | 23.3 | 2.5 | 4.5 | 4.0 | -3.5 | 6 |
| ROKKI | -38.9 | -72.9 | -44.7 | -52.8 | 34.0 | 8.1 | 17.7 | 8.5 | -11.6 | 8.2 | 7 |
| AVERAGES | -37.8 | -61.3 | -43.8 | -60.0 | 25.8 | 13.7 | | | | | |
| | | | | | | | RULE A | TEST B | TEST C | |

MAIN POLARIZATIONS ARE WITHIN 6 dB ON THE AVERAGE.
GUN X POLARIZATION IS ABOUT 8 dB HIGHER THAN THE NO GUN CROSS—ON THE AVERAGE.
GUN DIFFERENCE IS ABOUT 13.2 dB HIGHER THAN THE NO GUN DIFFERENCE—ON THE AVERAGE.
RULE A GIVES 91% DETECTION.
TESTS B AND C GIVE NO FALSE ALARM RATE.

1 ZOLT          MALE     5' 11"    180 lbs   NULLED
2 ROKKI         FEMALE   5' 6"     145 lbs   NULLED
9 KEYS IN FRONT POCKET AND NEXTEL PHONE IN BACK POCKET
4 LEATHER JACKET-NO ZIPPER
5 SPORTS COAT-NO SIDE UNIT
6 DEAN
7 LEATHER JACKET WITH ZIPPER-CAUGHT BY SIDE UNIT
8 CAUGHT BY SIDE UNIT IF RULE A IS GREATER THAN -1 dB, THEN WE HAVE A GUN.
IF TEST B AND C ARE BOTH POSITIVE WE HAVE A FALSE ALARM.

FIG-17

9.5 - 10.6 GHz SUMMARY FRONT CASES

| | FRONT | | | | | | FALSE ALARM | | NOTE # |
|---|---|---|---|---|---|---|---|---|---|
| | MAIN/NO GUN | X NO GUN | MAIN-GUN | X GUN | NO GUN D | GUN D | MARGIN | XG-XNGq AVE | XNG-XNG AVE | NGD-NGD AVE | |
| ROKKI | -62.5 | -81.7 | -67.1 | -82.7 | 19.2 | 15.6 | 4.2 | 3.2 | 4.2 | -0.6 | 1 |
| DEAN | -59.1 | -76.1 | -61.9 | -84.0 | 17.0 | 21.1 | -2.3 | 1.9 | 9.8 | -2.9 | 2 |
| ROKKI | -67.4 | -93.0 | -65.5 | -82.2 | 25.6 | 16.7 | 3.1 | 3.7 | -7.1 | 5.8 | 1 |
| ROKKI | -64.9 | -85.0 | -68.4 | -77.7 | 20.1 | 9.3 | 10.6 | 8.2 | 0.9 | 0.3 | 3 |
| GEORGE | -72.9 | -96.3 | -73.8 | -83.9 | 23.4 | 10.1 | 9.7 | 2.0 | -10.4 | 3.6 | |
| CHET | -69.5 | -83.3 | -70.2 | -76.4 | 13.8 | 6.2 | 13.7 | 9.5 | 2.6 | -6.1 | 4 |
| AVERAGES | -66.1 | -85.9 | -67.8 | -81.2 | 19.9 | 13.3 | | | | | |
| | | | | | | | RULE A | TEST B | TEST C | |

MAIN POLARIZATIONS ARE ABOUT THE SAME LEVEL - WITHIN 1.7 dB ON THE AVERAGE.
GUN X POLARIZATION IS ABOUT 4.7 dB HIGHER THAN THE NO GUN CROSS-ON THE AVERAGE.
GUN DIFFERENCE IS ABOUT 6.6 dB HIGHER THAN THE NO GUN DIFFERENCE-ON THE AVERAGE.
RULE A GIVES 100% DETECTION.
TESTS B AND C GAVE NO FALSE ALARM RATE.

DEAN           MALE    6' 1"   220 lbs
ROKKI WITH METAL RIMMED GLASSES
CHET           MALE    6' 0"   185 lbs
*CHET HAD GLASSES ON, GLASSES, MULTIPLE KEYS AND A SMALL POCKET KNIFE IN POCKETS.

IF RULE A IS GREATER THAN 0 dB, THEN WE HAVE A GUN.
IF TEST B AND C ARE BOTH POSITIVE AND GREATER THAN 1 dB WE HAVE A FALSE ALARM.

FIG-18

PARAMETERS FOR 3.075 GHz

ARRAY TEST MODEL 4X4 ARRAY

INPUTS

| | |
|---|---|
| FREQUENCY (GHz) | 3.075 |
| THETA START (deg) | 0 |
| THETA STEP (deg) | 0.5 |
| SPACING, S(") | 2.84 |
| COEFFICIENT, p | 1.53 |
| EDGE ILLUMINATION (dB) | -10 |
| SCAN ANGLE (deg) | 0 |
| MAX PHASE ERROR (Deg) | 0.00 |
| MAX AMPLITUDE ERROR (+,-dB) | 0 |
| NO. OF ELEMENTS | 4 |
| SWR | 2 |
| INSERTION LOSS (dB) | 1.5 |
| RANGE (ft) | 20 |

OUTPUTS

| | | | |
|---|---|---|---|
| C | 0.316 | 3dB BW | 32.8 DEGREES |
| WAVELENGTH (") =1 | 3.837 | 1st SL | 23.8 dB |
| $\pi * \Sigma/\lambda$ | 2.325 | GAIN | 17.4 dBi |
| RATIO | 1.000 | FAR FIELD | 5.6 Ft |
| MIN ERROR (V) | 1.000 | 3 dB SPOT | 11.8 Ft Dia |
| MAX ERROR | 1.000 | | |
| $\sigma =$ | 0.000 | 17.5 dB BW SHOULD BE | |
| PHASE RMS (deg) | 0.000 | LESS THAN 20 DEGREES | |
| AMP RMS (dB) + F36 | 0.000 | | |
| Rho | 0.333 | | |
| SWR LOSS (dB) | 0.51 | | |
| SIZE | 11.36 | | |
| An=C+(1-C) Cos((2n-1)/64*@pi)^p | | | |

ARRAY TEST MODEL 8X8 ARRAY

INPUTS

| | |
|---|---|
| FREQUENCY (GHz) | 3.075 |
| THETA START (deg) | 0.000 |
| THETA STEP (deg) | 0.100 |
| SPACING, s(") | 2.840 |
| COEFFICIENT, p | 1.000 |
| EDGE ILLUMINATION (dB) | -8.000 |
| SCAN ANGLE (deg) | 0.000 |
| MAX PHASE ERROR (Deg) | 0.000 |
| MAX AMPLITUDE ERROR (+,-dB) | 0.000 |
| NO. OF ELEMENTS | 8.000 |
| SWR | 2.000 |
| INSERTION LOSS (dB) | 1.500 |
| RANGE (ft) | 20.000 |

OUTPUTS

| | | | |
|---|---|---|---|
| C | 0.398 | 3 dB BW | 9.7 DEGREES |
| WAVELENGTH (") =1 | 3.837 | 1st SL | 18.9 dB |
| p*S/1 | 2.325 | GAIN | 24.1 dBi |
| RATIO | 1.000 | FAR FIELD | 22.4 Ft |
| MIN ERROR (V) | 1.000 | 3 dB SPOT | 3.4 Ft Dia |
| MAX ERROR | 1.000 | 17.5 dB BW | 20.0 DEGREES |
| s = | 0.000 | | |
| PHASE RMS (deg) | 0.000 | 17.5 DEGREE BW SHOULD | |
| AMP RMS (dB) + F36 | 0.000 | BE LESS THAN 20 DEGREES | |
| Rho | 0.333 | | |
| SWR LOSS (dB) | 0.512 | | |
| SIZE | 22.717 | | |
| An=C+(1-C)Cos((2n-1)/64*@pi) ^p | | | |

FIG-21

PARAMETERS FOR 10.05 GHz

ARRAY TEST MODEL 8 X 8 ARRAY

| INPUTS | | OUTPUTS | | |
|---|---|---|---|---|
| FREQUENCY (GHz) | 10.05 | C | 0.316 | |
| THETA START (deg) | 0 | WAVELENGTH (") = 1 | 1.174 | |
| THETA STEP (deg) | 0.5 | $\pi * \Sigma/\lambda$ | 2.702 | |
| SPACING, s(") | 1.01 | RATIO | 1.000 | |
| COEFFICIENT, p | 1.53 | MIN ERROR (V) | 1.000 | |
| EDGE ILLUMINATION (dB) | -10 | MAX ERROR | 1.000 | |
| SCAN ANGLE (deg) | 0 | $\sigma =$ | 0.000 | |
| MAX PHASE ERROR (Deg) | 0.00 | PHASE RMS (deg) | 0.000 | 3 dB BW | 8.9 DEGREES |
| MAX AMPLITUDE ERROR (+, -dB) | 0 | AMP RMS (dB) + F36 | 0.000 | 1st SL | 18.9 dB |
| NO OF ELEMENTS | 8 | Rho | 0.333 | GAIN | 24.2 dBr |
| SWR | 2 | SWR LOSS (dB) | 0.51 | FAR FIELD | 9.3 Ft |
| INSERTION LOSS (dB) | 1 | SIZE | 8.08 | 3 dB SPOT | 3.1 Ft Dia |
| RANGE (ft) | 20 | An=C+(1-C) Cos((2n-1)/64*@pi)^p | | | |

ARRAY TEST MODEL 10 X 10 ARRAY

| INPUTS | | OUTPUTS | | |
|---|---|---|---|---|
| FREQUENCY (HGz) | 10.05 | C | 0.316 | |
| THETA START (deg) | 0.00 | WAVELENGTH (") = 1 | 1.174 | |
| THETA STEP (deg) | 0.50 | p*S/1 | 2.702 | |
| SPACING, s(") | 1.01 | RATIO | 1.000 | |
| COEFFICIENT, p | 1.53 | MIN ERROR (V) | 1.000 | |
| EDGE ILLUMINATION (dB) | -10.00 | MAX ERROR | 1.000 | |
| SCAN ANGLE (deg) | 0.00 | s= | 0.000 | |
| MAX PHASE ERROR (deg) | 0.00 | PHASE RMS (deg) | 0.000 | 3 dB BW | 7.100 DEGREES |
| MAX AMPLITUDE ERROR (+, -dB) | 0.00 | AMP RMS (dB)+ F36 | 0.000 | 1st SL | 24.000 dB |
| NO OF ELEMENTS | 8.00 | Rho | 0.333 | GAIN | 26.017 dBi |
| SWR | 2.00 | SWR LOSS (dB) | 0.512 | FAR FIELD | 14.473 Ft |
| INSERTION LOSS (dB) | 1.50 | SIZE | 10.098 | 3 dB SPOT | 2.482 Ft Dia |
| RANGE (ft) | 20.00 | An=C+(1-C) COS((2n-1)/64*@pi)^p | | | |

FIG-22

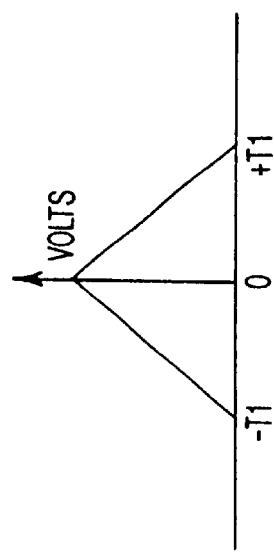
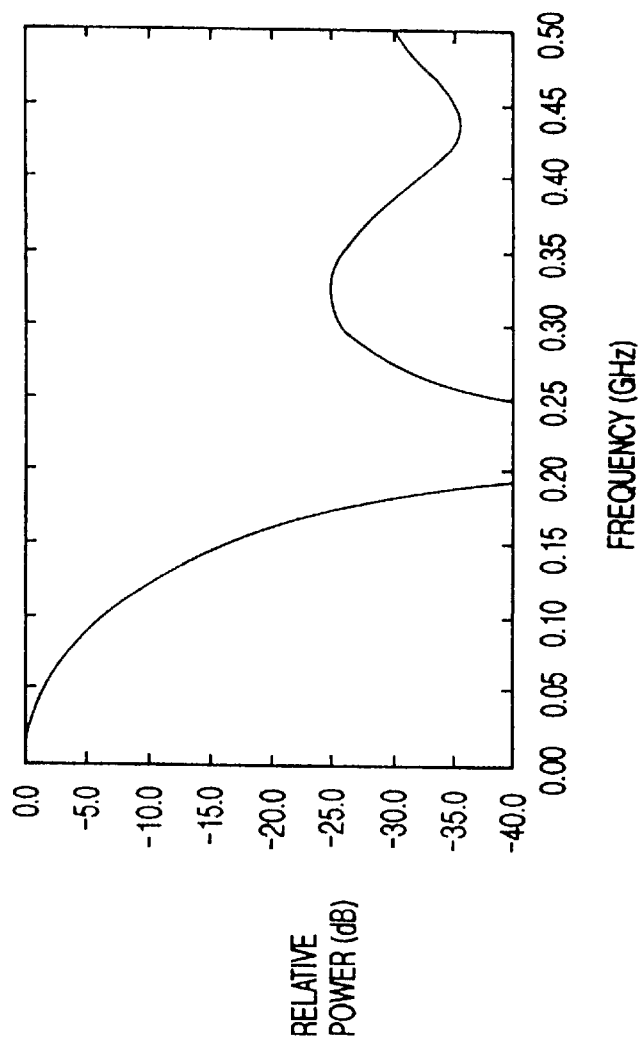
FIG-23

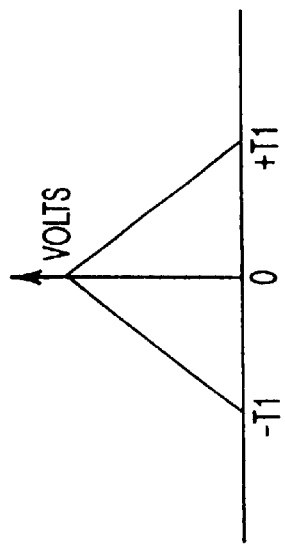
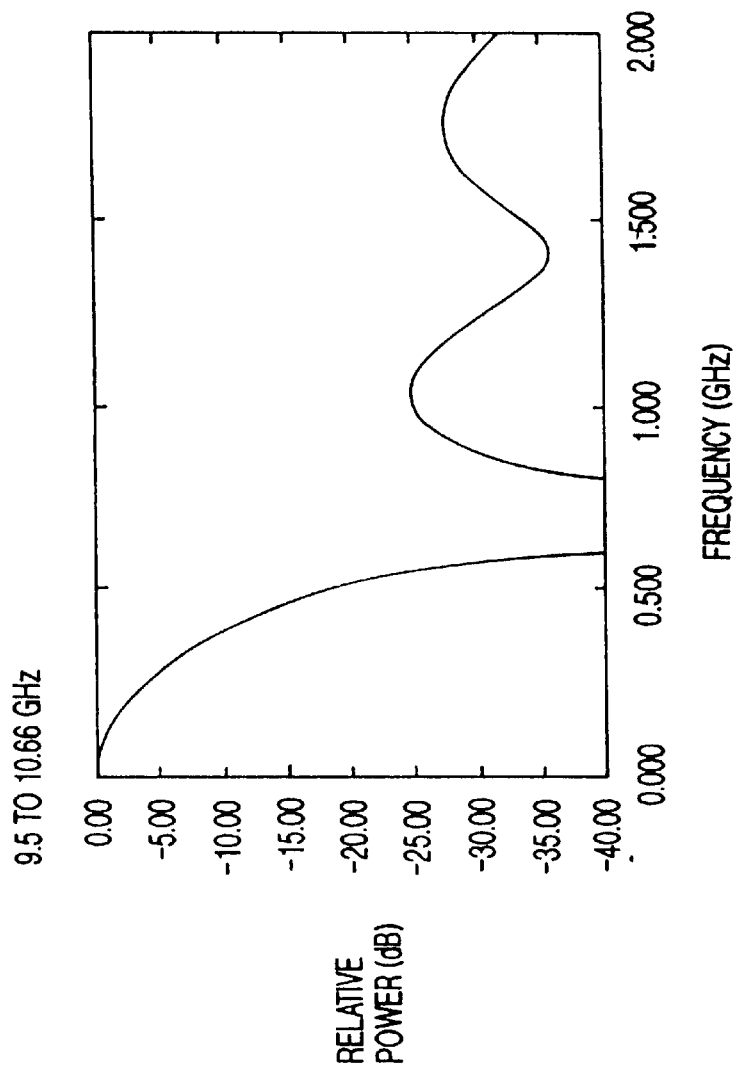
FIG-24

SYSTEM FLOW DIAGRAM

NOTE 1 : THE MINIMUM NUMBER OF SAMPLES IS 1.

SIGNAL PROCESSING FOR OBJECT DETECTION SYSTEM

CROSS-REFERENCE TO A RELATED PATENT APPLICATION & CLAIM FOR PRIORITY

The present Patent Application is a Continuation-in-Part Application based on a parent Patent Application entitled Object Detection System by George G. Chadwick, which was filed on May 25, 1999, and which was assigned U.S. Ser. No. 09/318,196. The Applicant hereby claims the benefit of priority under Section 120 of Title 35 of the United States Code of Laws for any and all subject matter which is disclosed in both the present Application and in the commonly owned and assigned parent Application.

FEDERALLY SPONSORED RESEARCH OR DEVELOPMENT

None.

FIELD OF THE INVENTION

The present invention is a system for remotely detecting the presence of an object. More particularly, one preferred embodiment of the invention supplies methods and apparatus for sensing concealed weapons to create a "Safe Zone™." The invention also includes novel signal processing methods and apparatus for providing high reliability object detection.

BACKGROUND OF THE INVENTION

On Apr. 20, 1999, two students at the Columbine High School in Littleton, Colo. opened fire on their classmates and teachers with assault weapons. Twelve teenagers and one teacher were killed, and dozens of others were wounded. Tragic acts of violence like the Littleton massacre occur all too often in present day America. The Federal Bureau of Investigation reports that every year, criminals in the United States use firearms to commit over 2.4 million robberies, 5.6 million assaults, and 165,000 rapes. (See *American Firearms Industry Journal*, published by the National Association of Federally Licensed Firearms Dealers, www.amfire.com.) The Center for Disease Control has collected data showing that 247,979 "firearm deaths" were recorded in the United States during the years 1986–1992. (Data compiled by the Center to Prevent Handgun Violence, www.handguncontrol.org.)

Many previous efforts to reduce the threat posed by the criminal use of firearms have met with limited success. In the past two decades, very expensive x-ray equipment has been installed in major airports. The machines are generally capable of detecting a metal gun in a very specialized, closed environment. This type of equipment requires a fixed installation, occupies a very large space, is close-range and may cost hundreds of thousands or even millions of dollars.

None of the complex concealed weapon detectors that are currently available in the commercial market are compact, lightweight, portable, easy to use, long-range and highly reliable. The development of such a device would constitute a revolutionary achievement and would satisfy a long felt need in the fields of law enforcement and security.

SUMMARY OF THE INVENTION

The present invention comprises methods and apparatus for detecting the presence of an object at a distance. One embodiment of the invention may be used to locate a concealed firearm carried by a person. The invention may be used to help keep weapons out of any secure area or "Safe Zone™," such as a school, bank, airport, embassy, prison, courtroom, office building, retail store or residence. The term "Safe Zone™" is a Trade and Service Mark owned by the Assignee of the present Patent Application, The MacAleese Companies, doing business as Safe Zone™ Systems, Incorporated.

One embodiment of the invention utilizes low-power, horizontally polarized radio waves to illuminate a target, such as a person who may be entering a doorway. Radio waves reflected from the target are gathered by a receive antenna and then processed by a detector circuit. The presence of the concealed weapon is determined by solving an algorithm which utilizes measured differences in the amplitudes of waveforms that represent different polarized energy levels reflected back from the target, and which also utilizes stored values which represent the expected response of a person who is not carrying a weapon, as well as the response of a person carrying a weapon.

Novel signal processing techniques are then utilized to improve the reliability of the detection method. In one preferred embodiment of the invention, radiation reflected from the target is sensed and converted to a signal which is processed using Fast Fourier Transforms. In general, this method separates a first signal which is generated by radiation reflected from the target, that is generally well-behaved, from a second signal, which is generated by radiation reflected from a human body, that is generally chaotic.

One embodiment of the present invention offers the additional benefits of being compact, lightweight, long-range, portable and battery-operated. In another embodiment, the invention may be incorporated into automatic door-opening equipment. In yet another alternative embodiment, the invention may be used to locate inexpensive tags attached to merchandise as an inventory control and anti-shoplifting system.

An appreciation of other aims and objectives of the present invention and a more complete and comprehensive understanding of this invention may be achieved by referring to the drawings, and by studying the description of preferred and alternative embodiments.

A BRIEF DESCRIPTION OF THE DRAWINGS

FIG. 1B illustrates a simple wave that is vertically polarized.

FIG. 1C illustrates a simple wave that is horizontally polarized.

FIG. 2 offers pictorial views of test setups for one embodiment of the present invention.

Figure 3:
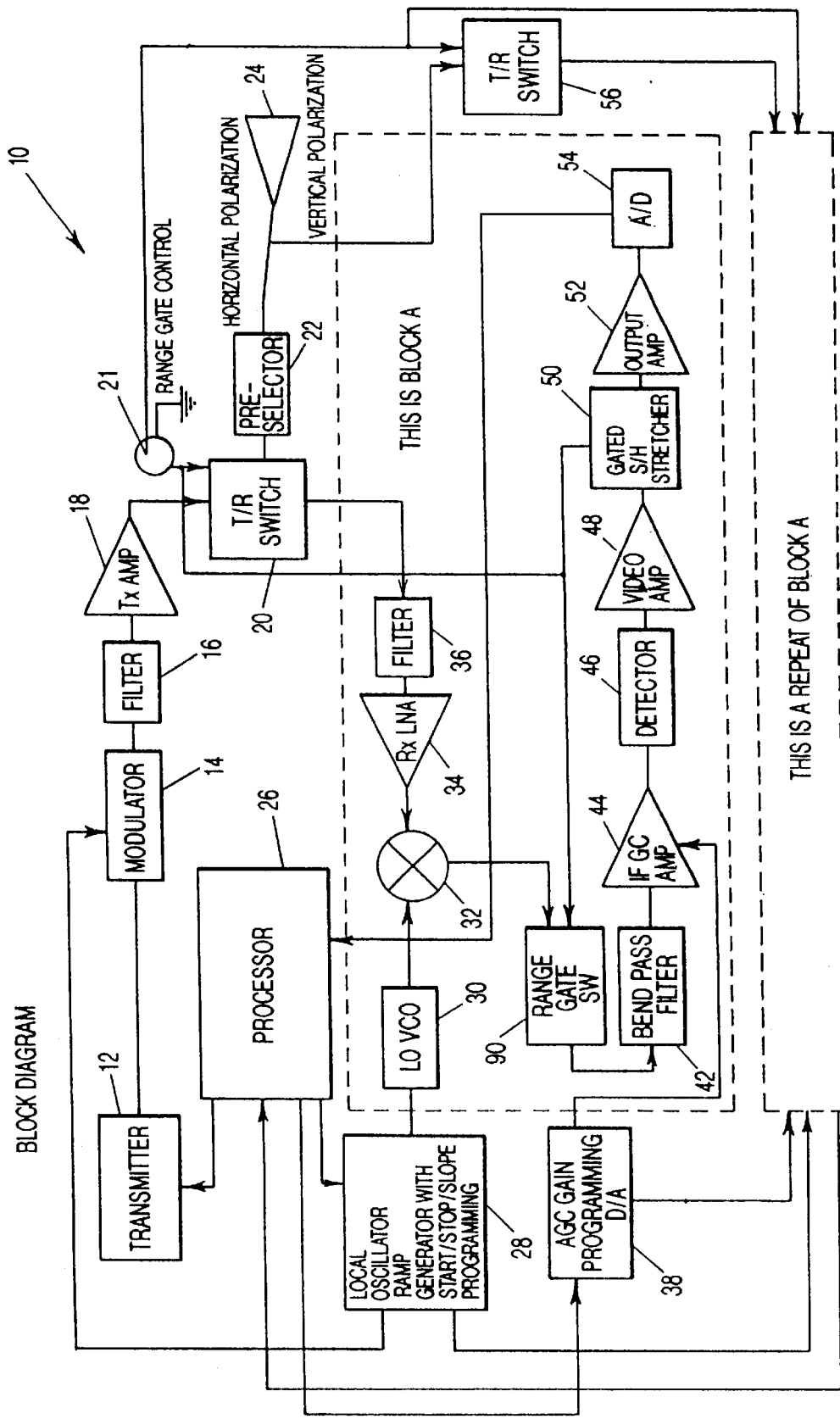

FIG. 3 provides a schematic block diagram of one embodiment of a transmission and detection circuit.

Figure 4:
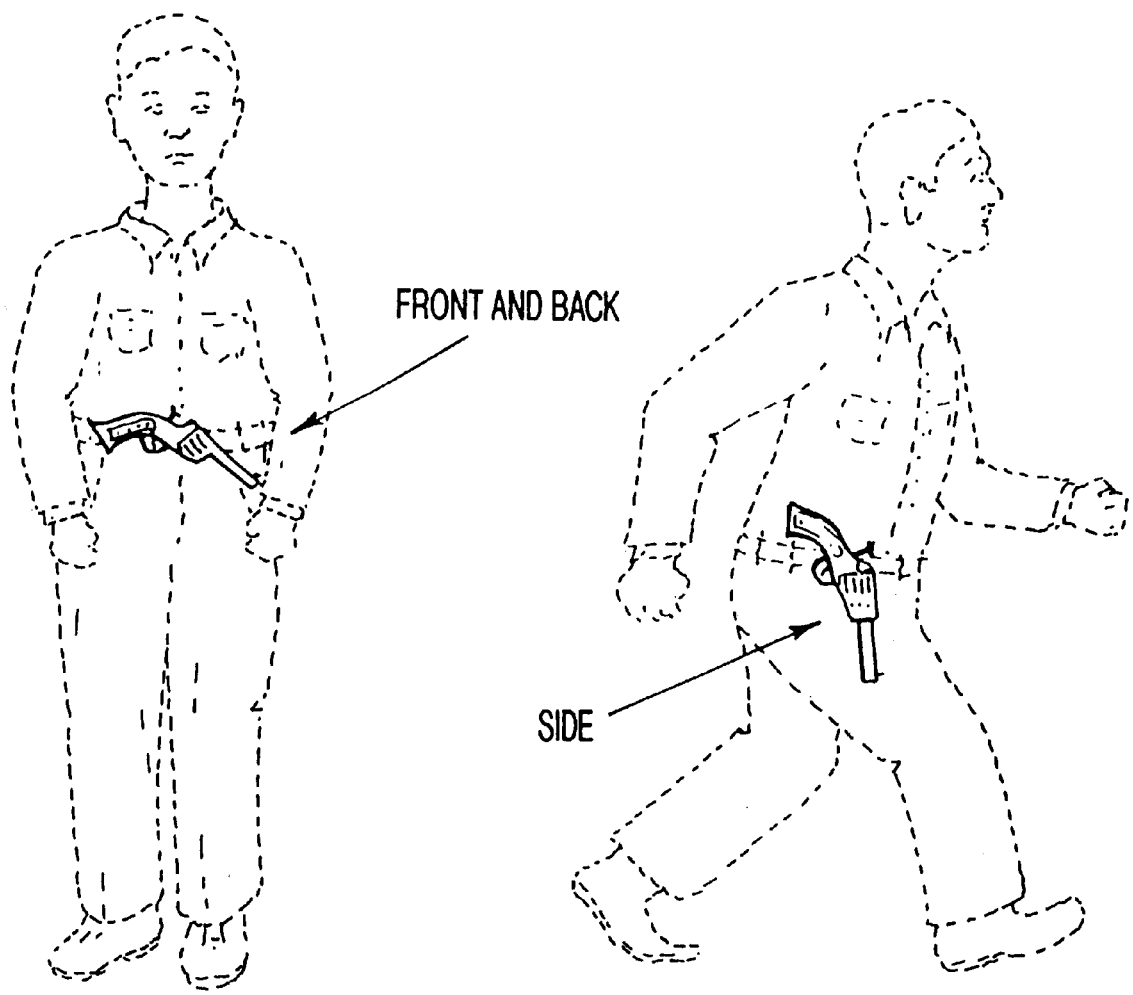

FIG. 4 portrays persons carrying guns in different locations relative to the body.

FIG. 5 is a viewgraph which explains the unit of radiation measurement, dBsm.

FIG. 6 is a chart which provides information concerning the radar cross section of a handgun.

Figure 7A:
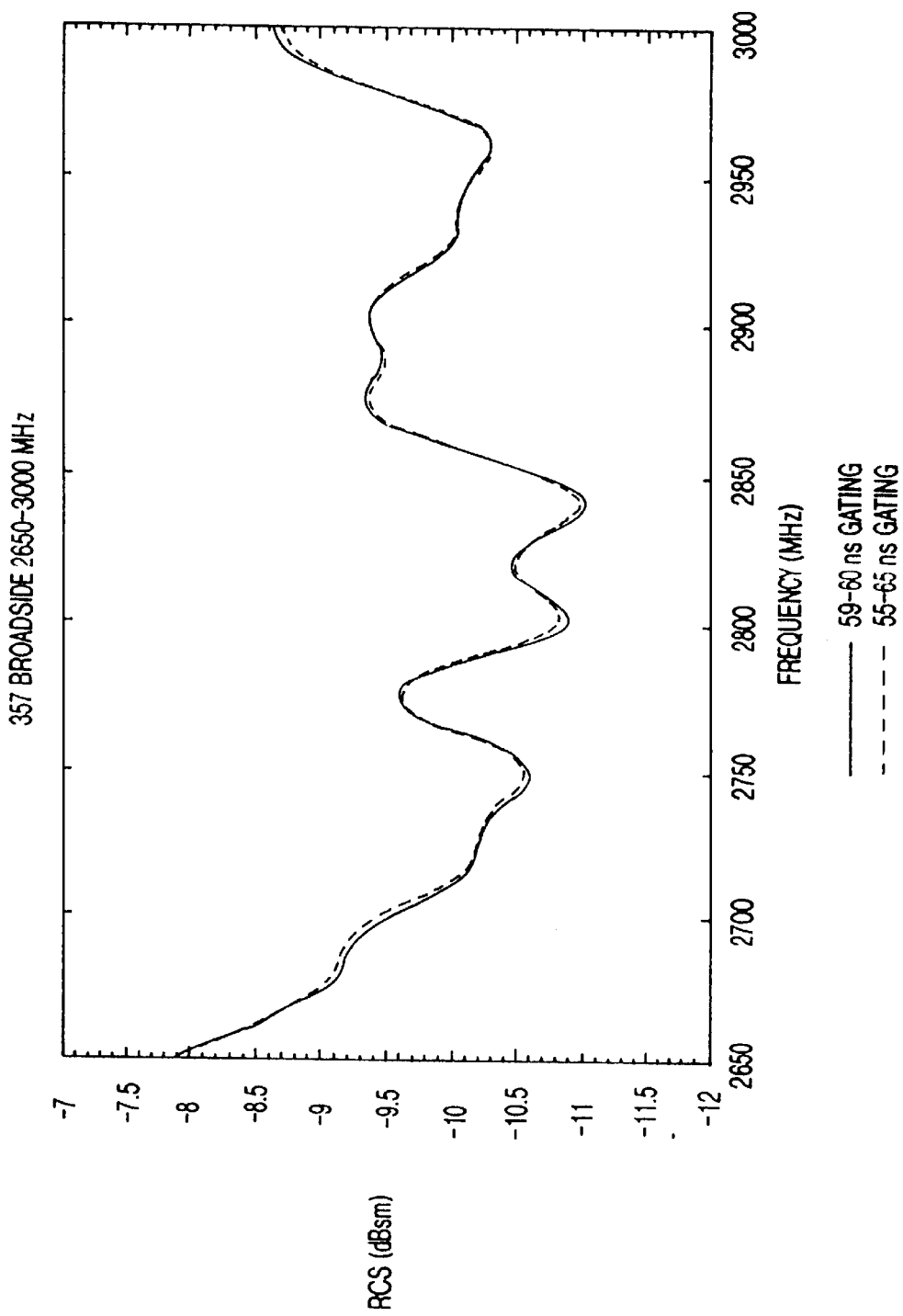
Figure 7B:
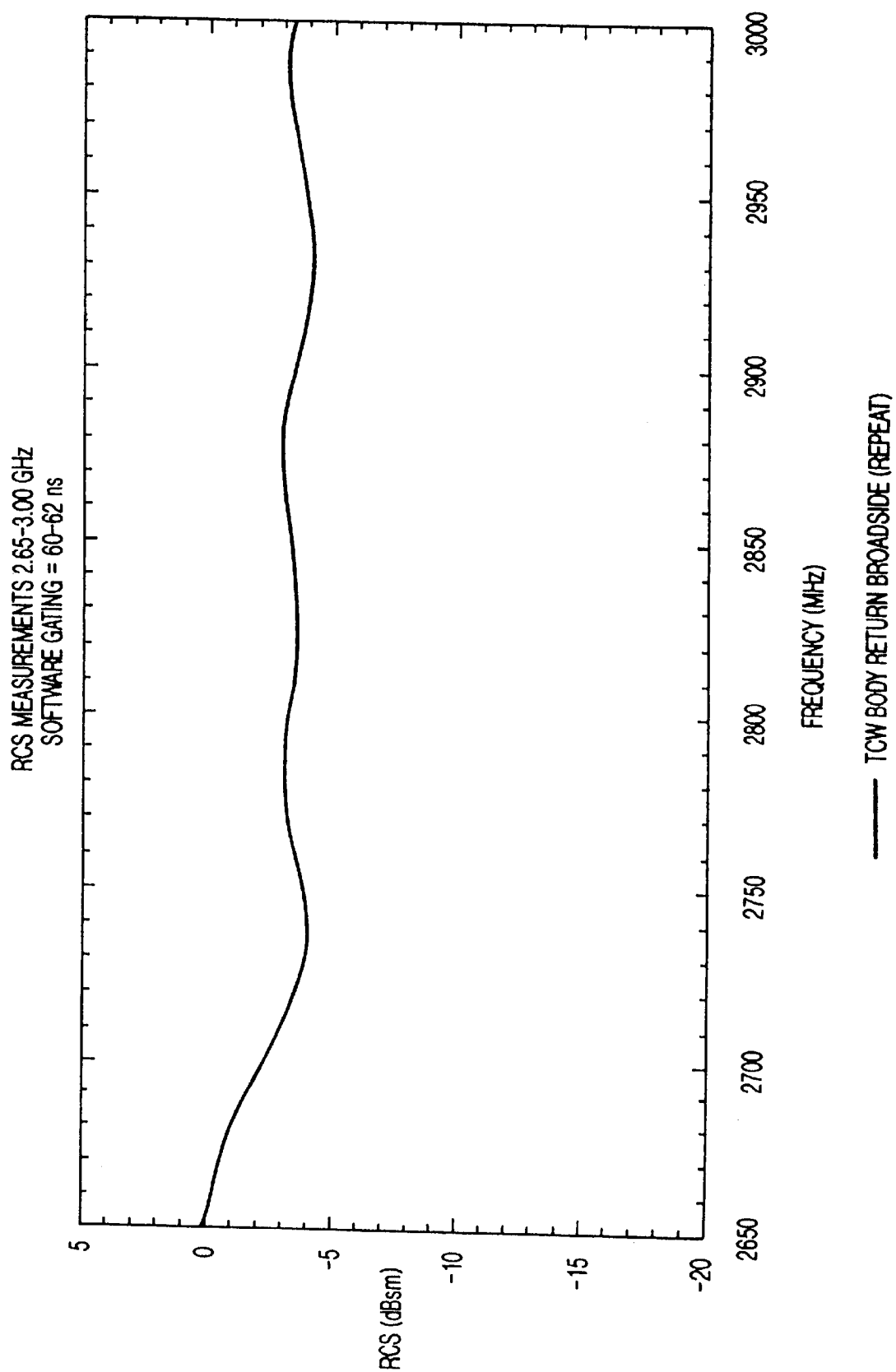

FIG. 7A is a graph showing the radar cross section of a handgun for a particular range of frequencies, plotting reflected energy in dBsm versus frequency. FIG. 7B is a graph showing the radar cross section of a human body for a particular range of frequencies, plotting reflected energy in dBsm versus frequency.

Figure 8:
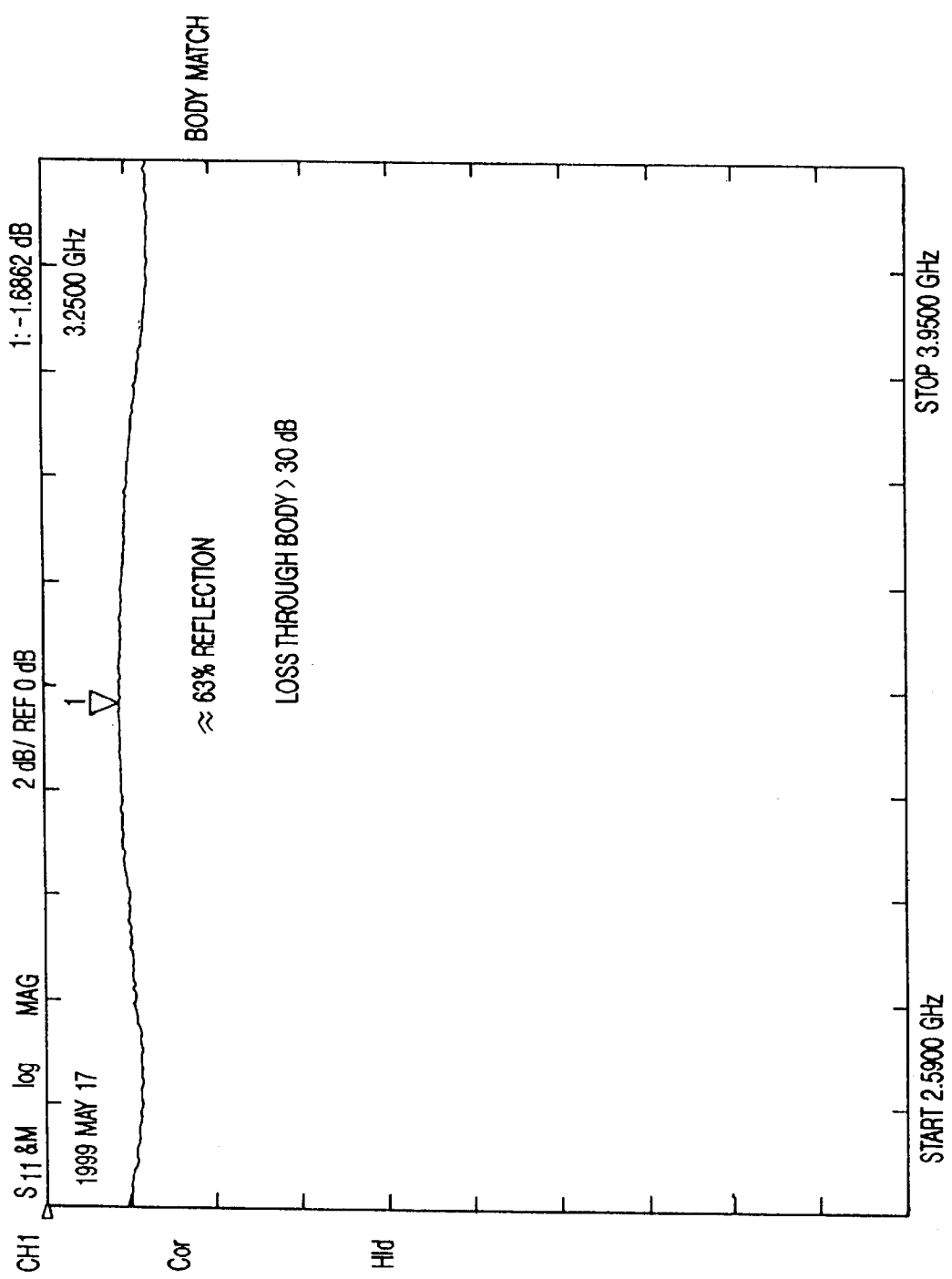
Figure 9:
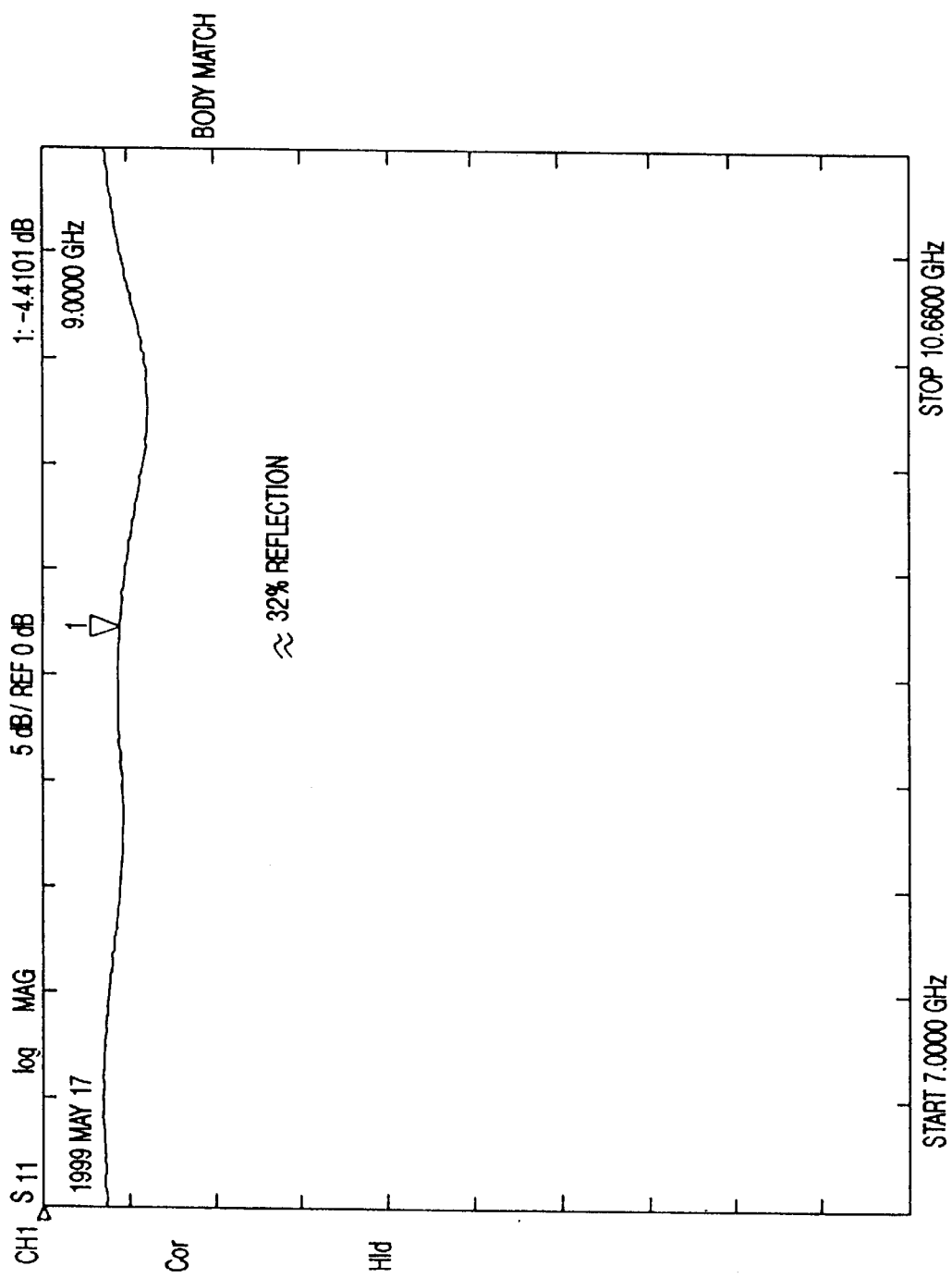

FIGS. 8 and 9 are graphs which supply information concerning the reflectivity of the human body when illuminated with radio waves in the 2.59 to 3.95 GHz and 7.0 to 10.66 frequency bands.

Figure 10:
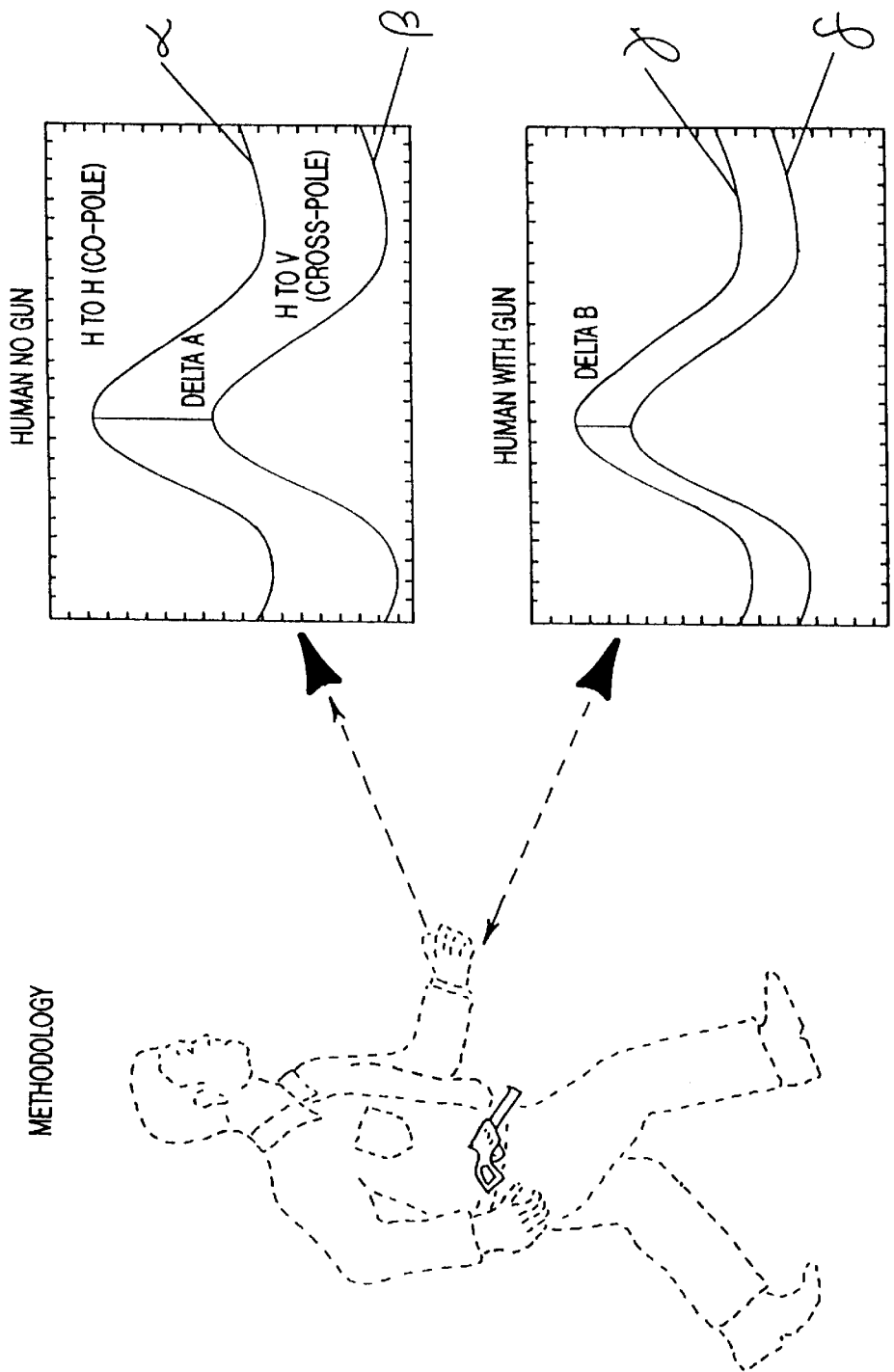

FIG. 10 furnishes a pictorial description of the present invention. The two graphs at the right of the drawing show that an object such as a handgun may be detected by comparing the time domain difference in amplitudes of two sets of waveforms which correspond to reflected radio waves having different polarizations. In both the upper and the lower graphs of FIG. 10, the two waveforms represent the vertically and horizontally polarized radio waves reflected back to the detector. When the person is not carrying a gun, the maximum amplitudes of the waveforms are spread relatively far apart. When the person is carrying a gun, the difference between the maximum amplitudes of the waveforms is substantially decreased.

FIG. 11 is a viewgraph that offers test data regarding the detection of a handgun in accordance with the present invention using the 9.5 to 10.6 GHz frequency bands. In this viewgraph, the transmit signal is vertically polarized.

FIG. 12 supplies actual test data concerning the detection of a handgun at the 2.9 to 3.25 GHz frequency band. In this figure, the transmit signal is horizontally polarized.

Figure 14:
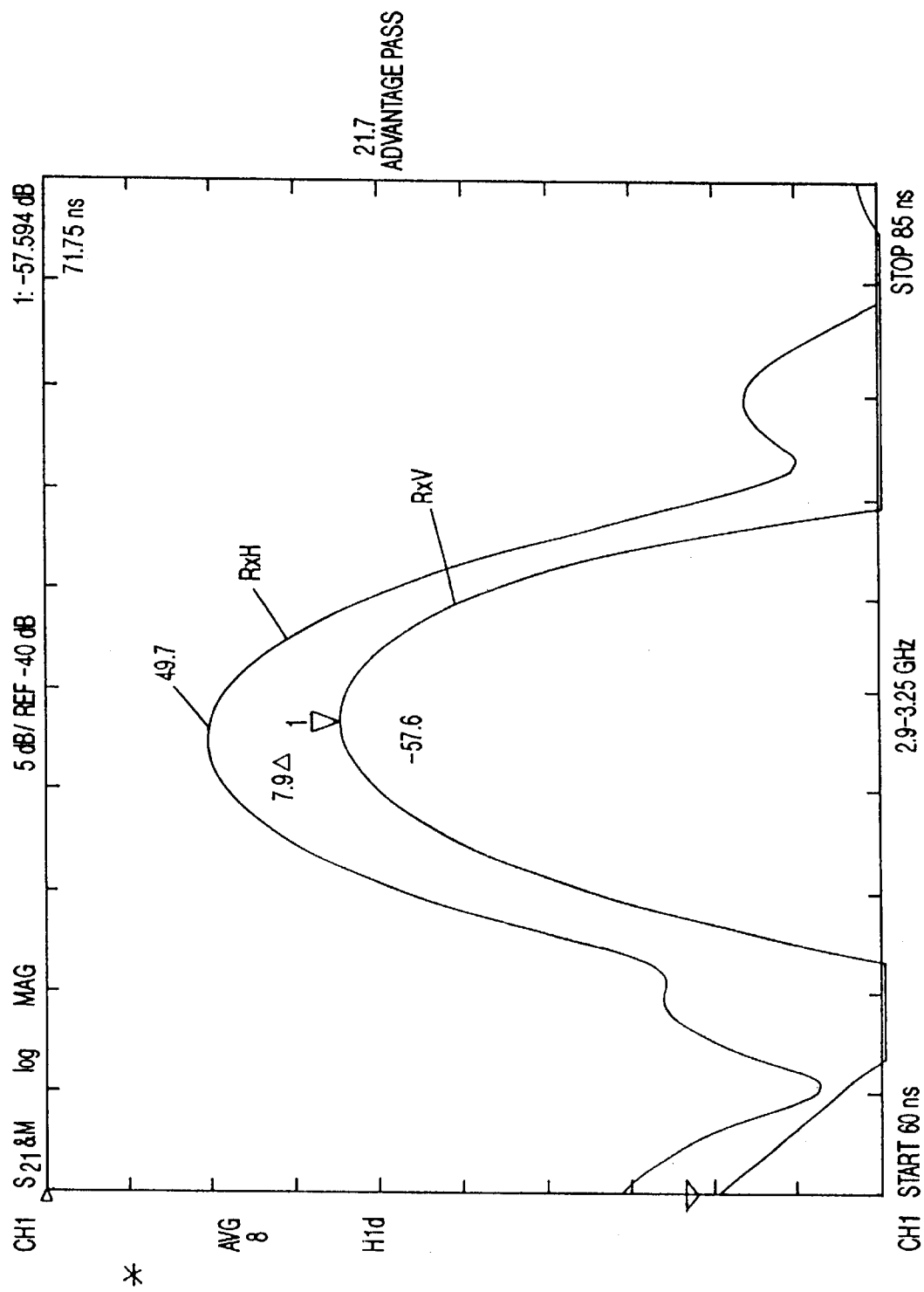

FIGS. 13 and 14 are actual test equipment plots of two pairs of time domain waveforms generated during a handgun detection experiment. In FIG. 13, the person was not carrying a gun, and the maximum values of the two curves are far apart. In FIG. 14, the same person was carrying a handgun, and the distance between the high points of the two curves appears much closer together, correctly indicating the presence of a gun.

FIGS. 15, 16, 17 and 18 exhibit laboratory test data for experiments conducted at two different frequency bands. The transmitted signal is a horizontally polarized signal. The received signal is both horizontally and vertically polarized.

Figure 19:
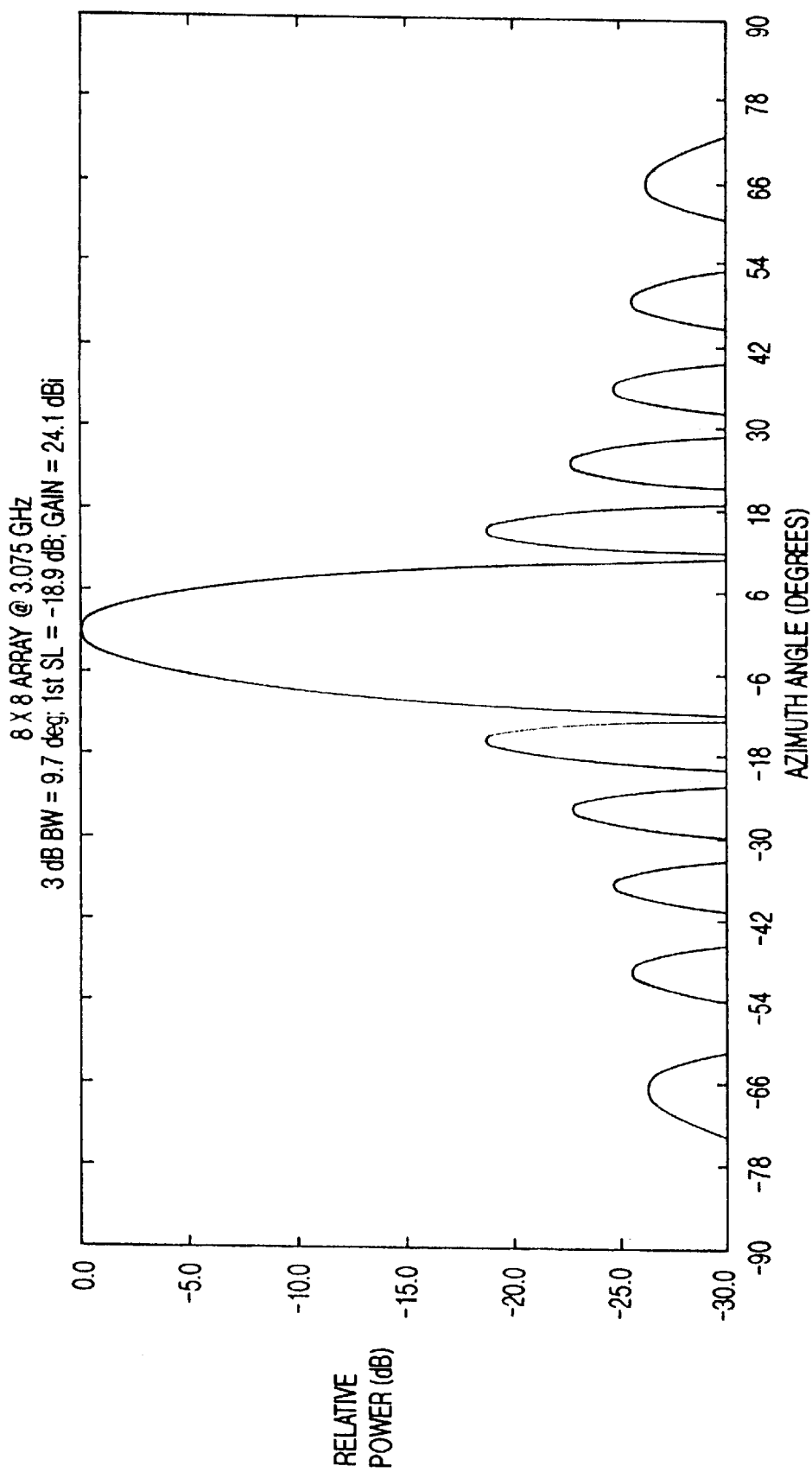
Figure 20:
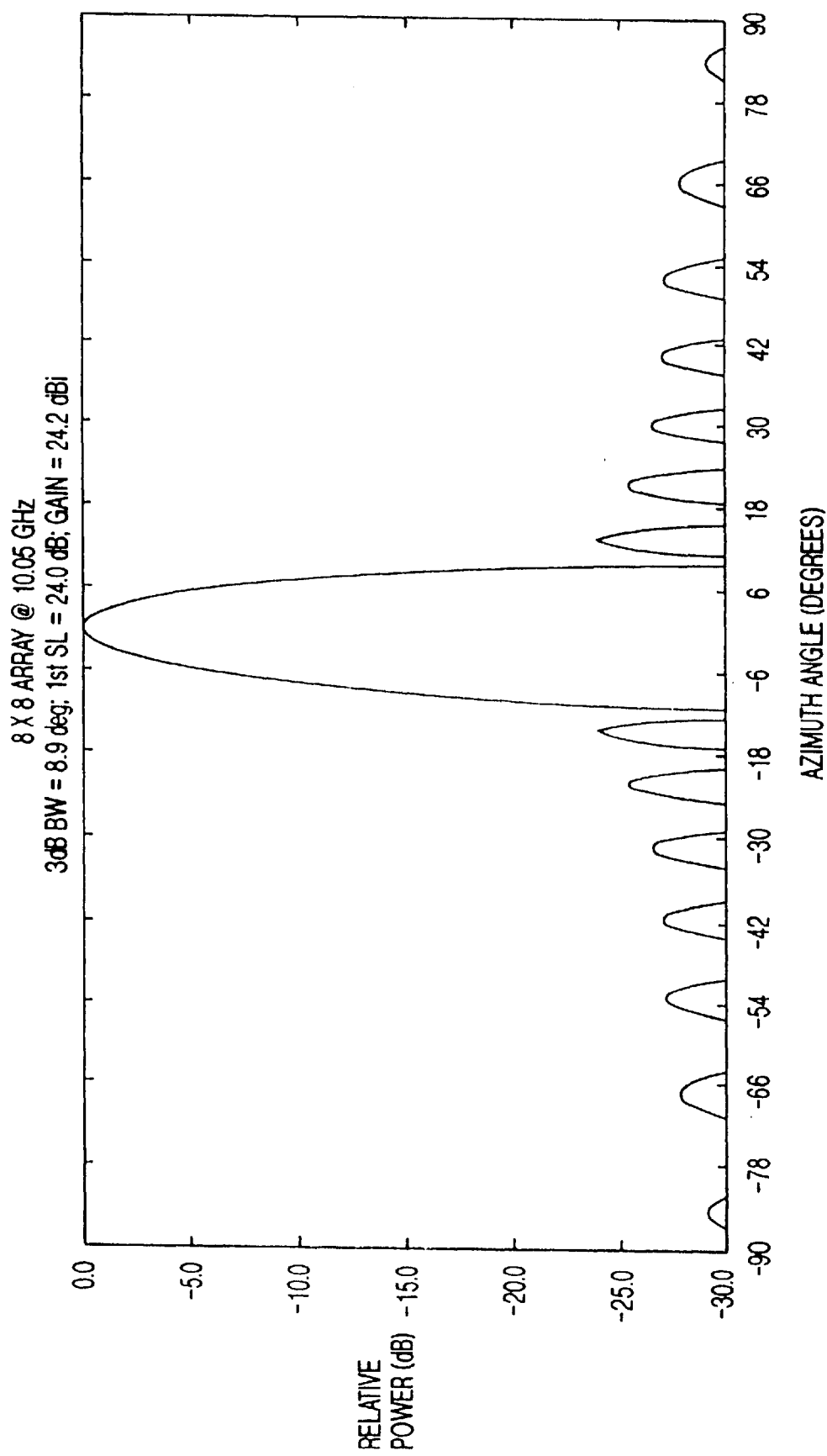

FIGS. 19 and 20 provide power versus azimuth angle plots for two 8 by 8 antenna arrays using two different frequency bands.

FIGS. 21 and 22 supply operational parameters for the present invention for two different frequency bands.

FIGS. 23 and 24 portray a triangular waveform that may be employed in an alternative embodiment of the invention to generate the required frequency domain waveform for detecting an object in the 2.9 to 3.25 and 9.55 to 10.66 GHz frequency bands.

Figure 25:
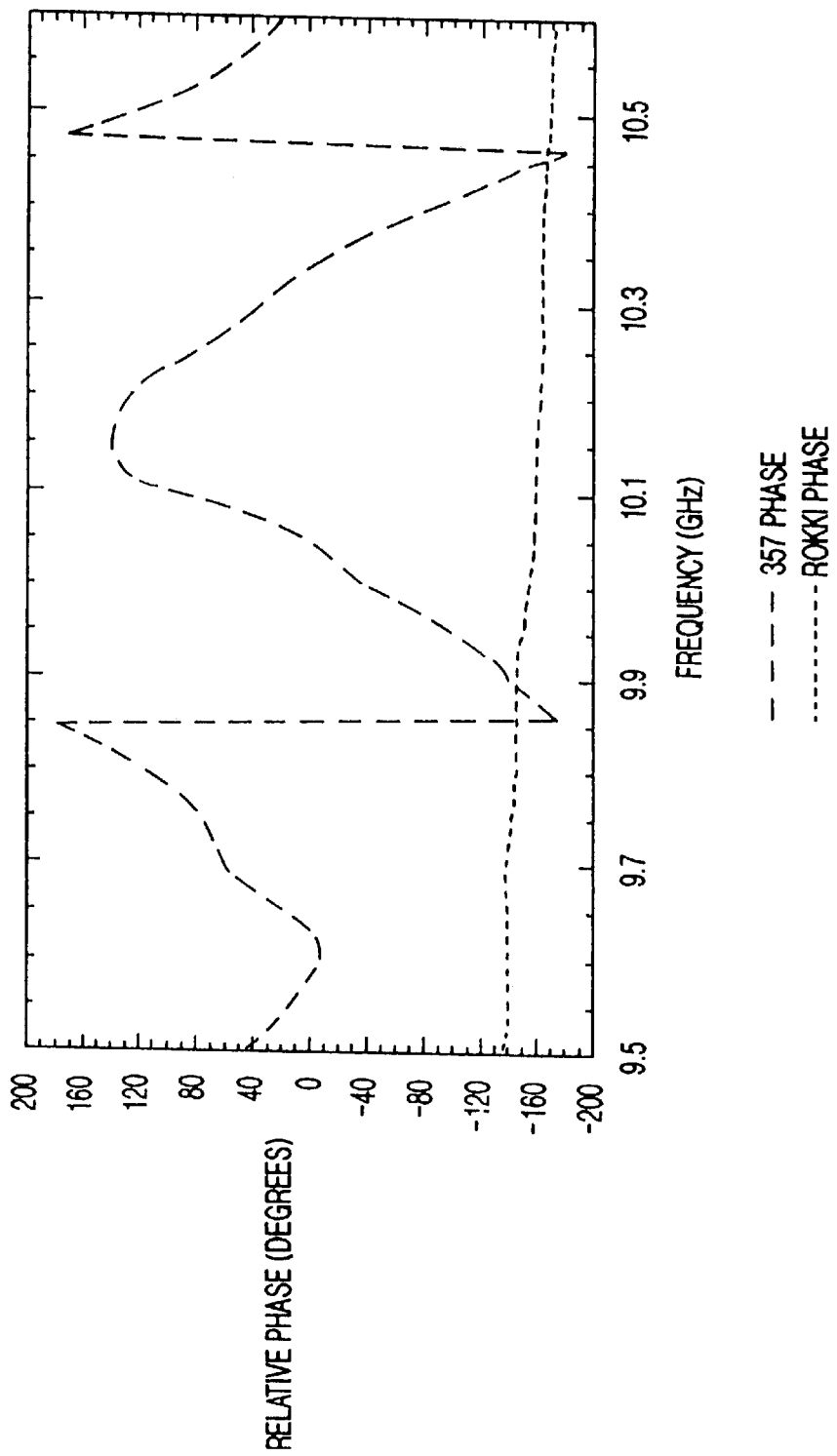

FIG. 25 is a plot of phase versus frequency for a 0.357 caliber pistol, and a sample of the return from a moving human body.

Figure 26:
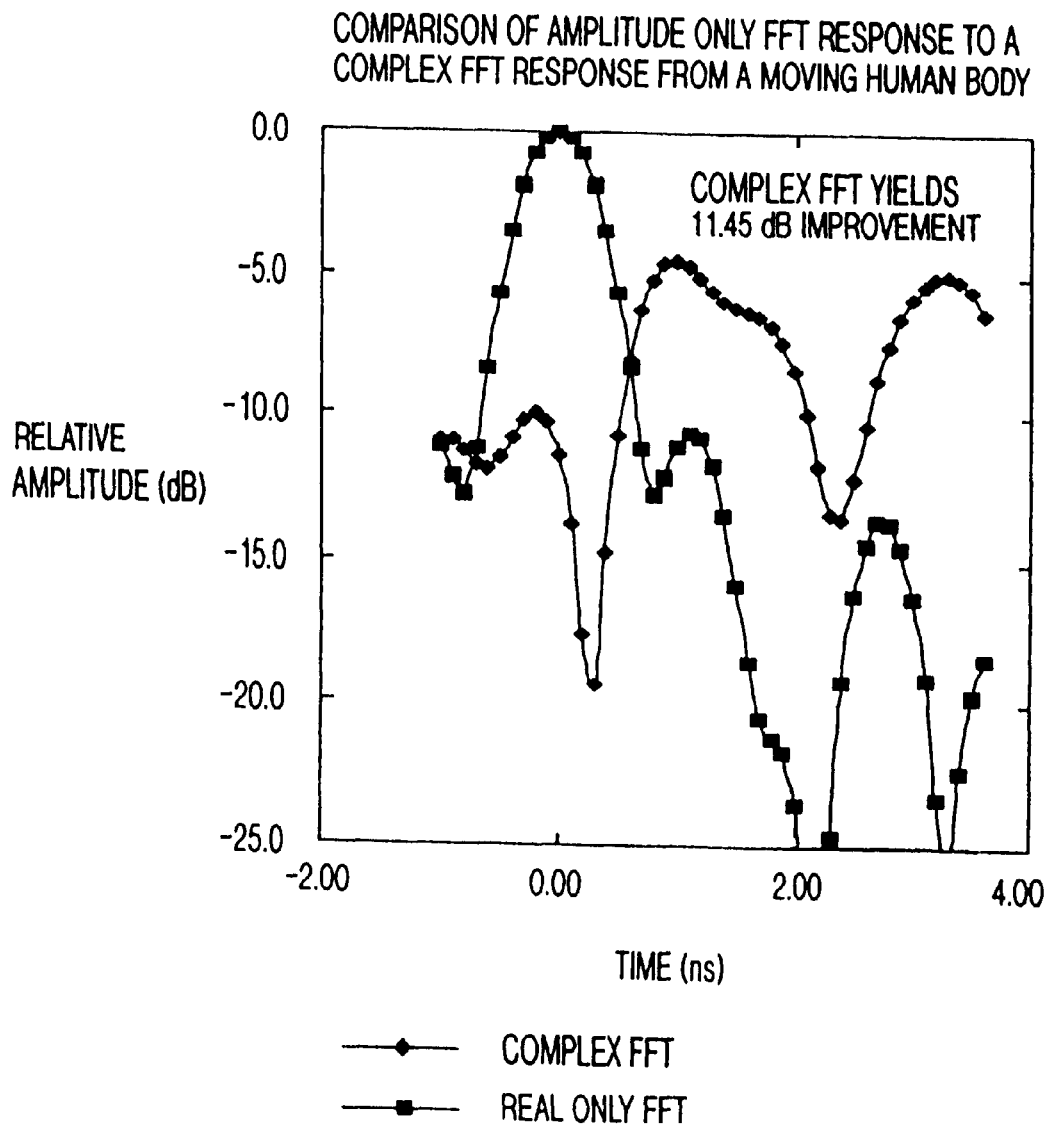

FIG. 26 reveals a reduction in the return from the body because of its uncorrelated nature.

Figure 27:
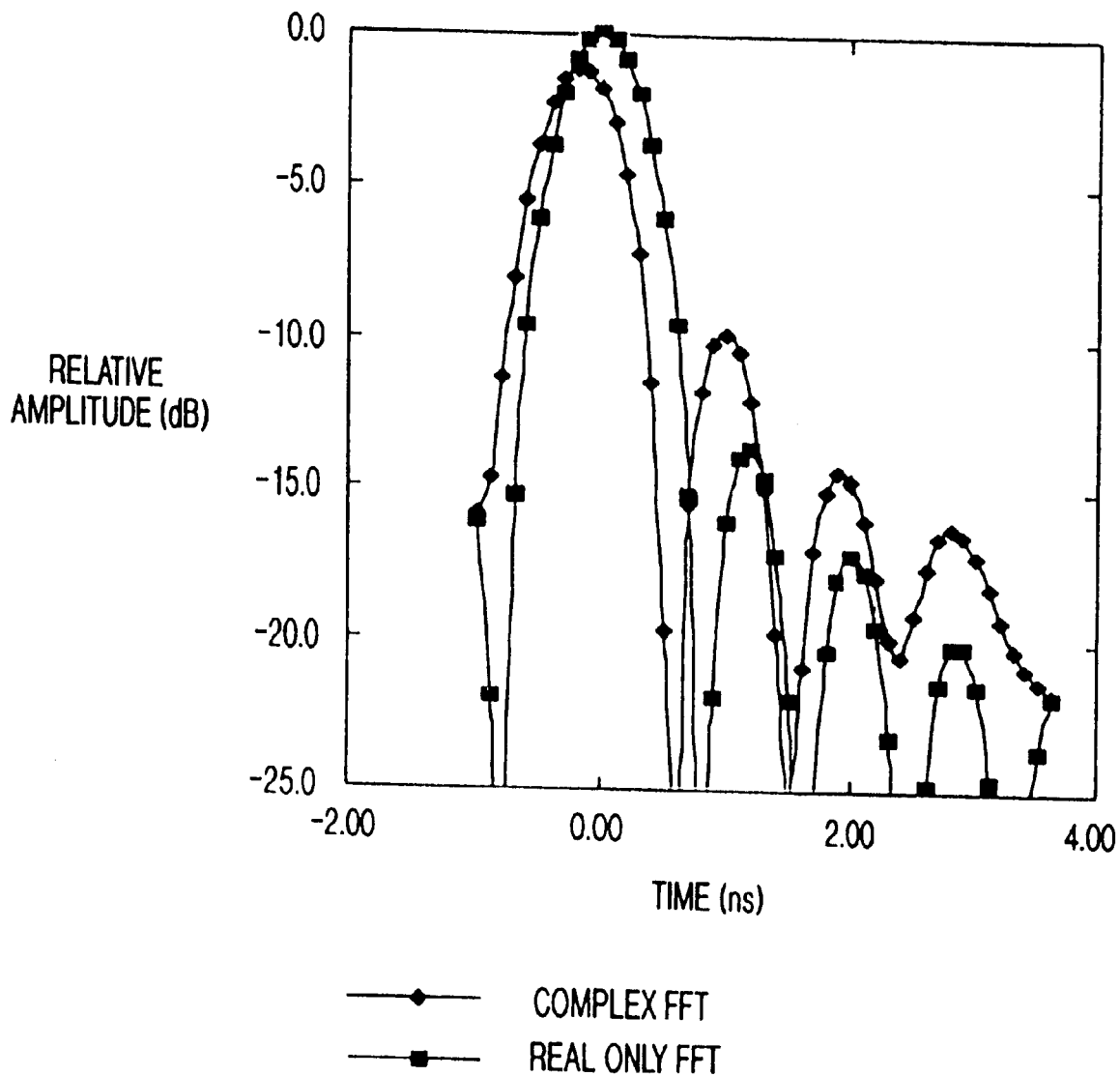

FIG. 27 depicts the return from the 0.357 weapon. Its phase is correlated and its magnitude is unchanged.

Figure 28:
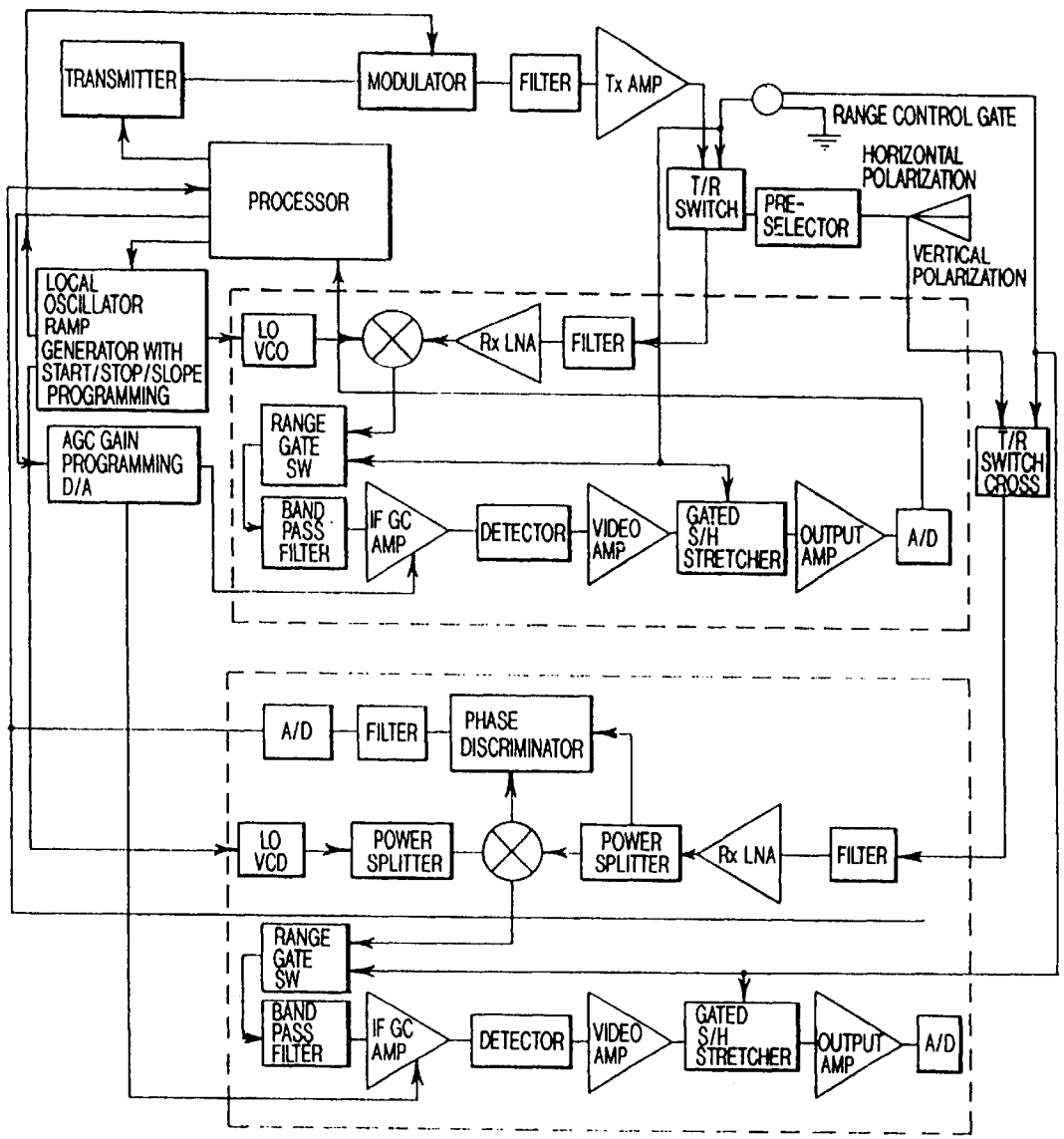
Figure 29:
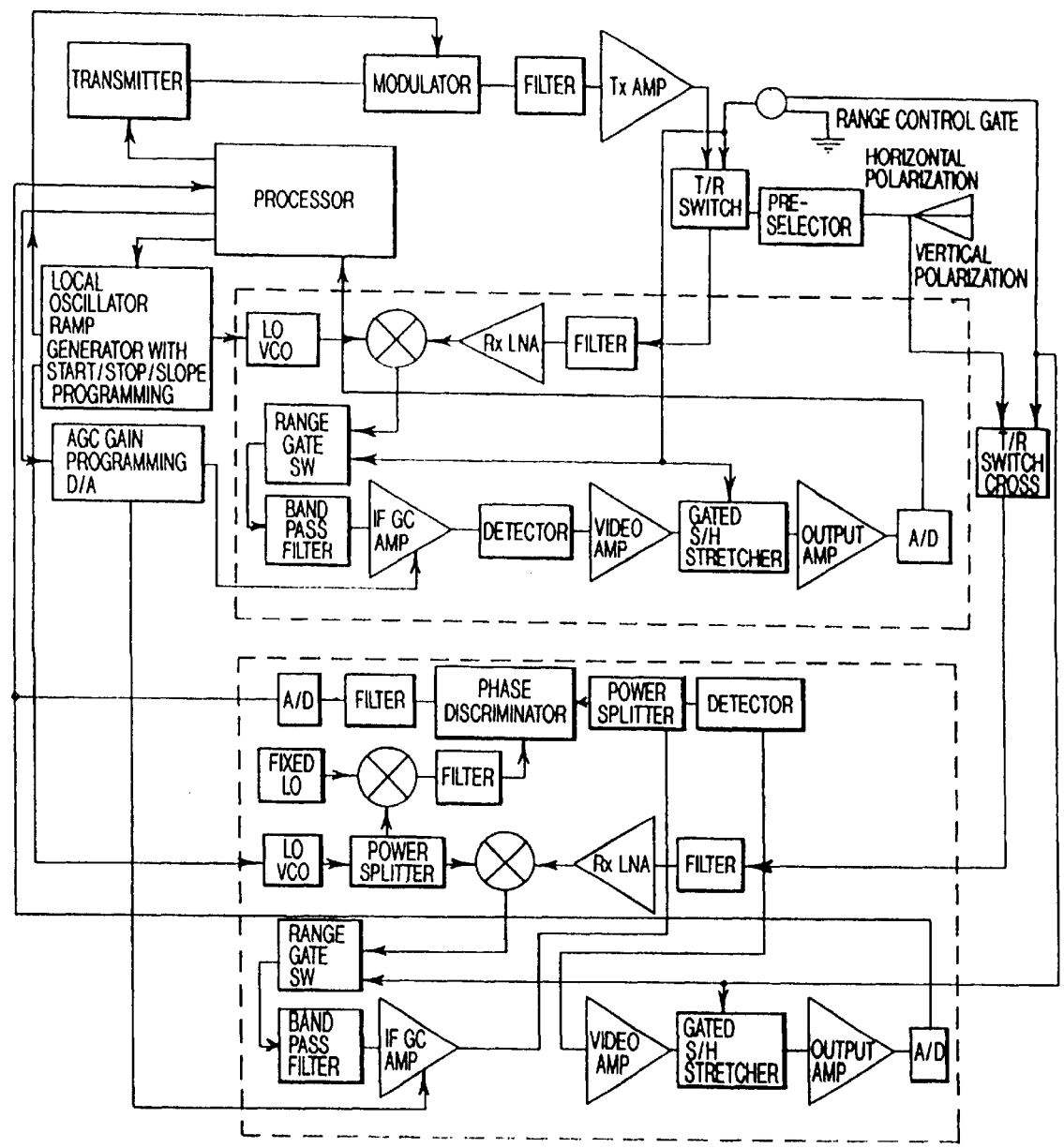

FIGS. 28 and 29 supply schematic block diagrams of circuitry that is used in a preferred embodiment of the invention to measure phase of the returned cross-pole signal.

Figure 30:
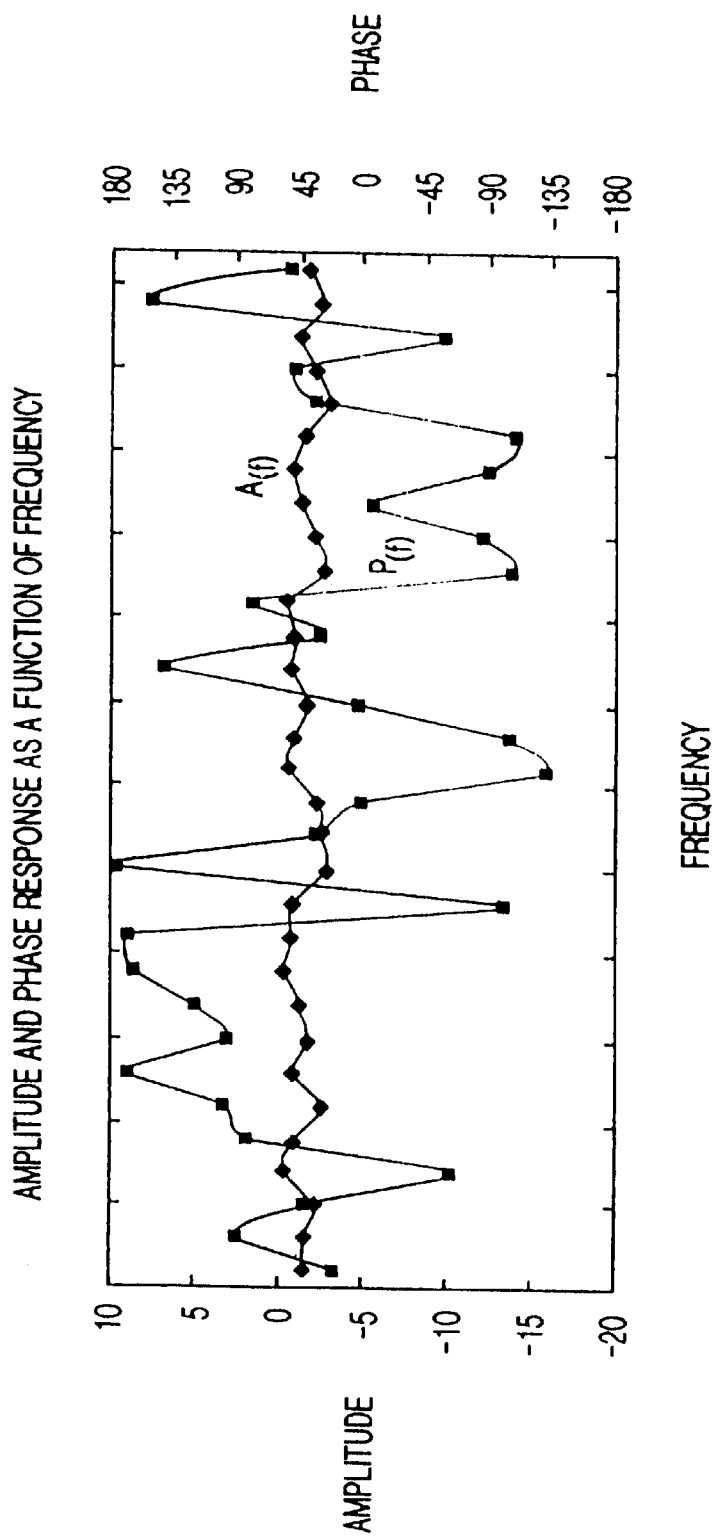

FIG. 30 is a general illustration of the phase and amplitude response used for the Complex FFTs that are employed in a preferred embodiment of the invention.

Figure 31:
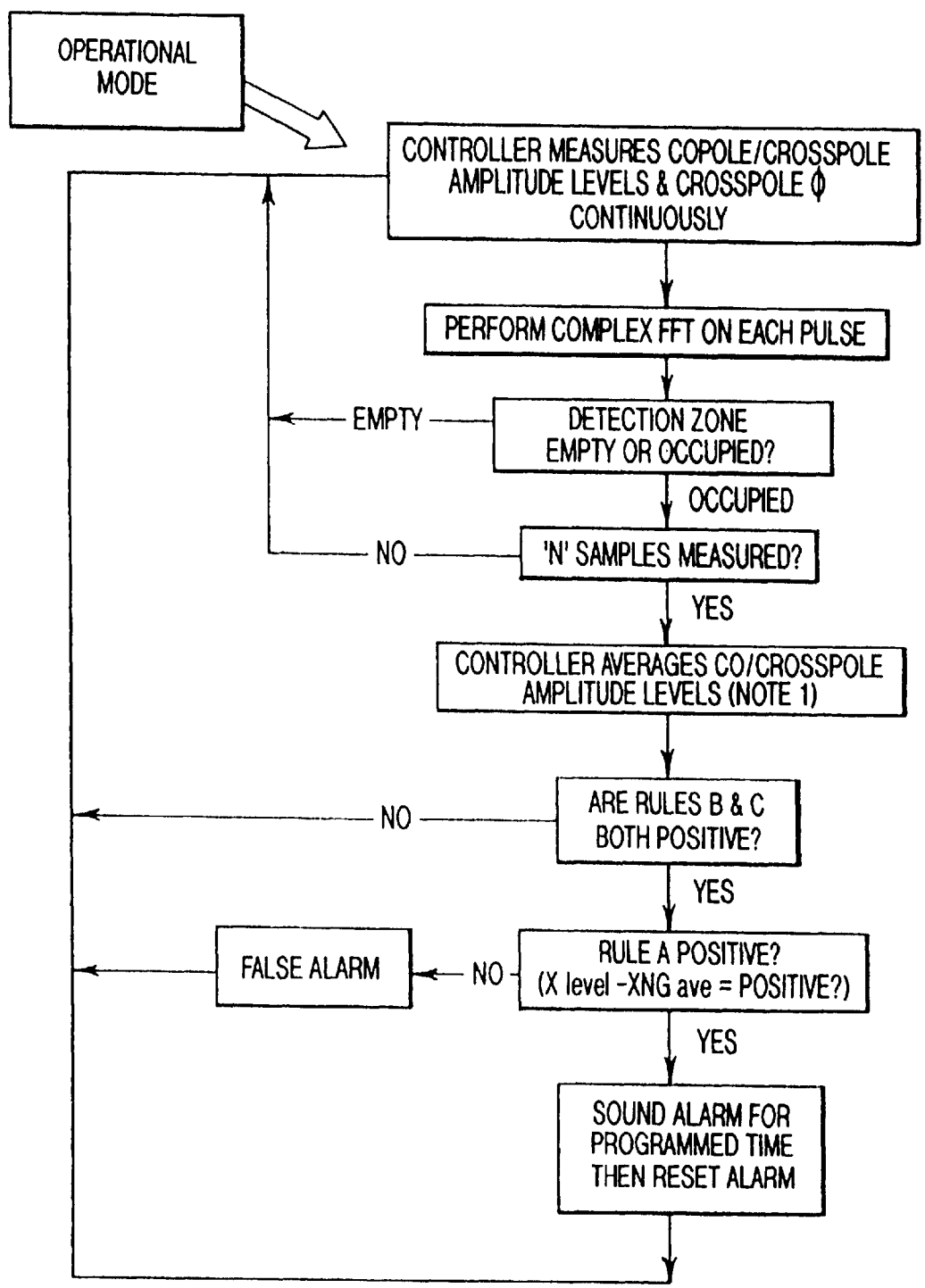
Figure 32:
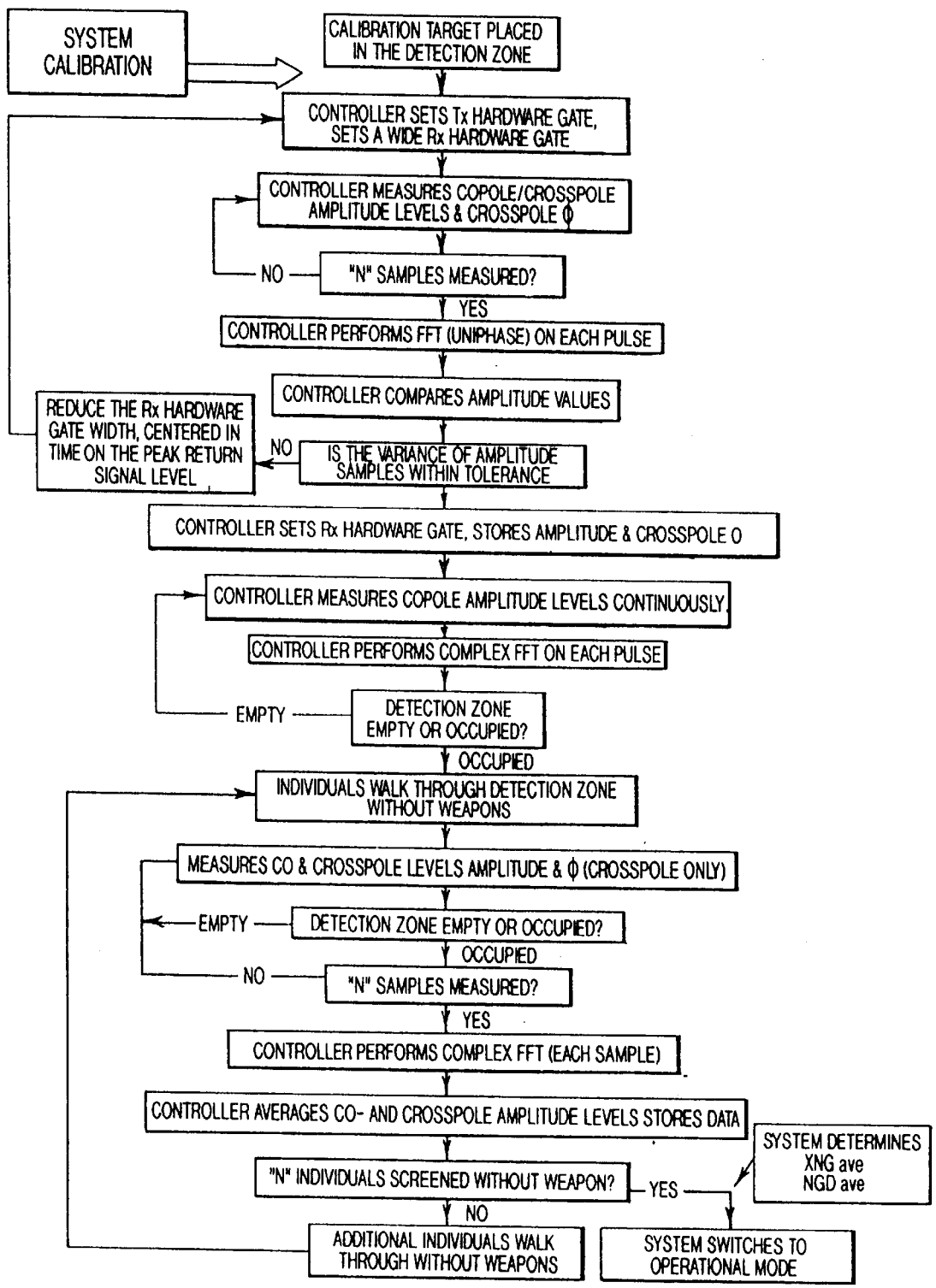

FIG. 31 offers an operational system flow diagram, while FIG. 32 offers a flow-chart which explains how a preferred embodiment of the invention is calibrated.

A DETAILED DESCRIPTION OF PREFERRED & ALTERNATIVE EMBODIMENTS

I. Radio Waves & Polarization

Figure 1A:
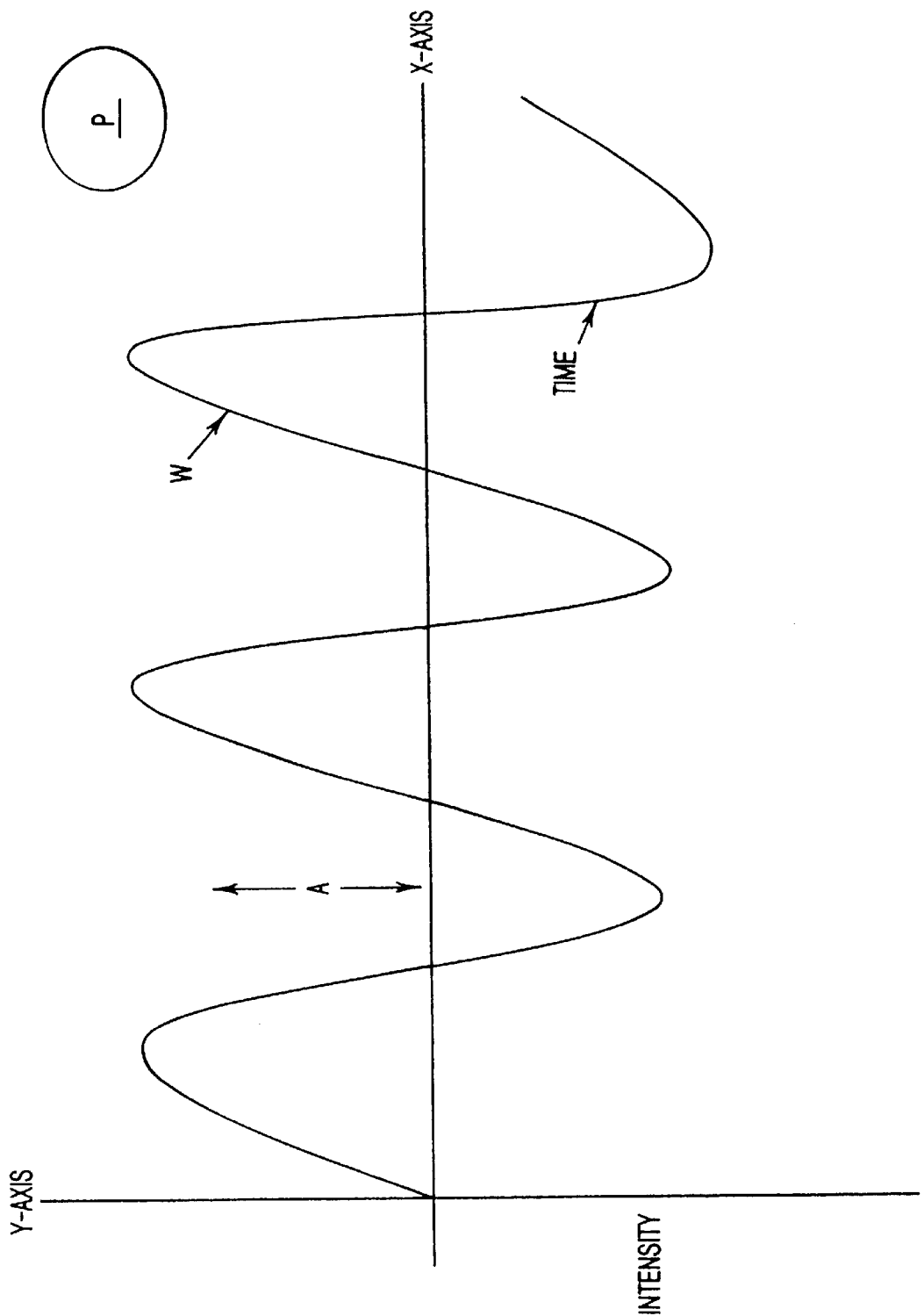
FIG. 1A illustrates a simple wave.

As radio waves travel through the air, they travel in a way similar to waves of water moving across the surface of the ocean. The shape of a simple radio signal can be depicted as a repeated up and down movement or vibration, as shown in FIG. 1A. This up and down motion of the wave takes place in three dimensions. The simple wave (W) propagates. A wave which is polarized parallel to the plane of propagation is called a horizontally polarized wave. A wave which is polarized perpendicular to the plane of propagation is called a vertically polarized wave. The height or intensity of the wave W is called the amplitude (A) of the wave.

FIG. 1B exhibits a wave which is vertically polarized, while FIG. 1C reveals a wave which is horizontally polarized. Vertical and horizontal polarizations are said to be orthogonal forms of polarization. Other terms that may be used to describe the relationship between waves that are vertically and horizontally polarized are perpendicular, opposite, cross-polarized, or main and complementary.

The idea of polarization is applicable to all forms of transverse electromagnetic waves, whether they are radio waves at microwave frequencies, or light waves such as those emitted by a flashlight.

II. Detection of Objects

FIG. 2 depicts laboratory apparatus that may be used to practice one embodiment of the invention. A low-power radio transmitter coupled to a transmit antenna ($T_x$) is used to illuminate a target inside an anechoic chamber. A receive antenna ($R_x$) collects energy reflected back from the target within the chamber. A single dual polarized antenna may be used in some embodiments of the present invention. In a series of experiments conducted to detect persons carrying a handgun in the chamber, a conventional metal 0.357 caliber pistol is employed. When used in this Specification and in the claims that follow, the term "target" refers to a physical item toward which illuminating radiation is pointed. The target is usually a person. When used in this Specification and in the claims that follow, the term "object" refers to a physical item that is carried on, worn or somehow physically attached, coupled or associated with a target. In one embodiment of the invention, the object that is detected is a concealed weapon.

The power levels radiated by the present invention are much lower than conventional radar systems or than those generated by x-ray or other imaging systems that are currently employed to detect objects at the entry of an airport or a courtroom.

In general, some of the preferred embodiments of the invention operate in the GHz frequency bands. Different radio frequencies offer different benefits and disadvantages for the object detection provided by the present invention. In the United States, operating frequencies of radio devices are regulated by the Federal Communications Commission. Each country across the globe has similar regulatory bodies which allocate and administer the use of the radio spectrum. Although the description of some embodiments of the invention include specific references to particular frequency ranges, the system may be beneficially implemented using a wide variety of electromagnetic radiation bands.

FIG. 3 presents a schematic block diagram 10 of circuitry that may be used to implement one embodiment of the invention. A transmitter 12 is coupled to a modulator 14, a filter 16, and a transmitter amplifier 18. This amplifier 18 is connected to an antenna 24 through a first transmit/receive switch 20 and a pre-selector 22. The transmit/receive switch 20 is also connected to a range gate control 21. A processor 26 is used to control transmitter 12. The output of a local oscillator ramp generator with start/stop/slope programming 28 is connected to modulator 14 and to a local oscillator/voltage control oscillator 30. The output of the local oscillator 30 is fed to a mixer 32. An output of transmit/receive switch 20 is also fed to mixer 32 through a filter 36 and a receive low-noise amplifier 34. An output from the processor 26 is conveyed to an automatic gain control programming digital to analog converter 38. An output from the D/A converter 38 controls an intermediate frequency gain control amplifier 44, which also receives an input from a mixer 32 through range gate switch 40 and band pass filter 42. An output from the IF GC amplifier then passes through detector 46, video amplifier 48, a gated sample and hold stretcher 50, an output amplifier 52 and an analog-to-digital converter 54 before being fed back to processor 26.

FIG. 3 includes a section labeled "Block A" which includes circuit elements 30, 32, 34, 36, 40, 42, 44, 46, 48, 50, 52 and 54. This block is duplicated in the circuit, but is shown as a second rectangle drawn in dashed line at the bottom of the figure. This lower rectangle is labeled with the legend "This is a repeat of Block A" and with the reference character 58. The left side of this repeated Block A 58 is shown connected to the AGC gain programming D/A converter 38, the local oscillator 28, and to processor 26. The right side of this repeated Block A 58 is shown connected to the range gate control 21, and to a second transmit/receive switch 56.

FIG. 4 is a pictorial rendition of two persons carrying handguns. On the left side of the figure, a person is shown with a gun held in place either in front or in back of a belt. On the right side of the figure, another person is shown with a gun carried in a bag or pouch situated on the hip at the person's side. Different methods, which are described below, are employed to detect objects or weapons that are concealed in various places on the body.

FIG. 5 is a chart which explains a unit of measurement, "dBsm," that is used to quantify reflected radiation. The dBsm is based on a unit of measurement called the decibel, named after Alexander Graham Bell, and is abbreviated "dB." Decibels are used to compare two levels of radiated or reflected power. As an example, if a person listening to a radio is very close to the antenna tower of a radio station, the power level would be very high. If the same person were many miles away from the same antenna tower, the strength of the received radio waves would be much lower because of the increased distance. Decibels could be used to quantify this ratio of power levels as a single number. Unlike common fractions, which are simply one number divided by another number, decibels are a logarithmic form of measurement, which is highly usefull since they are used to compare very large differences in numbers. Since radiated power levels can vary over such large ranges, a logarithmic scale is used instead of a more common linear scale. Decibels are calculated as follows:

$$dB = 10 \log P_X/P_Y \quad (1)$$

where $P_X$ is a first power level, and $P_Y$ is a second power level. When the two received radio signals are compared using decibels, the reduction in the power of the signal that is received at the greater distance is said to be a certain number of decibels lower than the power level at the closer location.

The term "dBsm" is a measure of the size of the target expressed in decibels and compared to one (1) square meter. Mathematically, dBsm is expressed as:

$$10 \log (AG) \quad (2)$$

where A is the area of the target in meters and G is the gain of the target on reflection. This expression assumes that the area is flat relative to the wavelength of operation, and that the area is uniformly illuminated by radio waves. If the side of a square area is "a" in meters, then the area becomes "$a^2$" in square meters. The value G (or gain) for a surface which is flat relative to the wavelength of operation is equal to $$4\pi a^2/\lambda^2 \quad (3)$$

where the wavelength $\lambda$ is equal to 0.3/f meters and f is frequency in GHz. When expression (3) is combined in expression (2), the result is:

$$10 \log (4\pi a^4 f^2/0.09) \text{ dBsm} \quad (4)$$

This expression indicates that if the size of the side, "a", is doubled, the reflection increases by 12 dBsm, or in linear power units, the area is 16 times greater. If the frequency doubles, the reflection becomes 6 dBsm greater or 4 times as great in linear power units. Complicated edge effects are ignored in this description.

FIG. 5 shows the radar cross section in dBsm as a function of physical size. The term G of equation (2) is not used and so the results of this partial segment of the radar cross section is frequency independent. When the G factor of equation (2) is added, the 6"×6" plate at 1 GHz increases from −16.4 dBsm to −11.3 dBsm. Since the factor G, or gain, increases proportional to $f^2$, an increase from 1 to 10 GHz would increase the value of FIG. 5 from −11.3 dBsm to 8.7 dBsm a difference of 20 dB. In fact however, the weapons shape is significantly non-planar relative to the wavelength and thus very little increase is real.

FIG. 6 supplies information concerning a term of measurement called "radar cross section." When radio waves are generated and then directed toward an object, some portion of those transmitted waves pass through the object, another portion of those waves are absorbed by the target, and a third portion of the transmitted waves are reflected back toward the transmitter. The larger the portion of reflected waves, the greater the radar cross section of an object. An object that has a relatively large radar cross section is therefore relatively easier to detect, compared to an object that has a smaller radar cross section. The magnitude of the measured radar cross section of an object depends largely on its reflectivity, and on the spatial orientation of the object. For example, suppose a radar station on the shoreline is looking for ships at sea nearby. Ships which are traveling parallel to the coastline are easier to detect than a similar vessel that is sailing away from land, since the radar waves that hit the first ship broadside bounce back to the radar station with greater intensity than those which only reflect off of the smaller stem of the boat that is bound straight out to the ocean. The boat which is oriented "sideways" to the direction of travel of the radar waves has a larger radar cross section than the stern of the boat, which presents a smaller target to the radar waves.

When the present invention is used to detect an object like a handgun, the detection is more easily accomplished when the handgun is oriented in a way that presents a relatively larger radar cross section to the detector. For example, a gun that is tucked behind a person's belt buckle so that the side of the gun is flat against the waist presents a larger radar cross section than a weapon holstered on the hip with the gun barrel pointing toward the ground and the grip pointing forward or back.

The data in FIG. 6 is the radar cross section of a metal 0.357 caliber handgun illuminated by electromagnetic radio waves in several frequency bands. These data were established to calibrate the detector equipment and to provide reference measurements. Similarly, FIG. 7A provides data regarding the radar cross section (RCS) of a 0.357 caliber pistol for transmitted radiation spanning the 2650 to 3000 MHz frequency range. The curve shows that for a gun oriented in the broadside position, meaning that the longest dimension of the gun extends sideways in the plane of the transmitted radio wave, the radar cross section (RCS) measured in dBsm varies from about −8 dBsm to −11 dBsm over this frequency range.

FIG. 7B represents a body return in the same frequency band as FIG. 7A. The average radar cross section across the band is −3 dBsm or approximately 8 dB stronger than the average gun return of −11 dB.

FIGS. 8 and 9 provide measurements of the reflection of radio waves of a person in the test chamber. FIG. 8 contains empirical data that indicates that when a person is illuminated with radiation, about 63% of the radio wave energy is reflected back from the body between 2.59 to 3.95 GHz. FIG. 9 shows that about 32% is reflected back between 7.0 to 10.66 GHz. This information was gathered using radio waves transmitted at the 2.59 to 3.95 and the 7.0 to 10.66 GHz bands.

FIG. 10 exhibits the fundamental mode of operation of one embodiment of the present invention. Persons entering a protected space or "Safe Zone™" are illuminated with radio waves which are horizontally polarized. A portion of these radio waves are absorbed, while some are reflected back toward the transmitter. When the transmitter illuminates a person without a gun, the two similar curves in the upper graph in FIG. 10 result. These two curves represent the amplitude of the horizontally polarized energy reflected back to the detector (the upper curve), and the amplitude of the vertically polarized energy reflected to the detector (the lower curve) in the time domain. The gap, labeled "Delta A," between the maximum amplitudes of these two curves is relatively wide compared to the gap between the maximum amplitudes of the two curves in the graph in the lower right portion of FIG. 10.

The lower graph shown in FIG. 10 contains two curves produced when a person is carrying a handgun that is sensed by the detector in the time domain. The gap between the curves, labeled "Delta B," is substantially narrower than the gap in the upper graph. As in the upper graph, the two curves represent the energy level of horizontally polarized radio waves reflected from the person (the upper curve), and the energy level of vertically polarized radio waves reflected back from the person (the lower curve) in the time domain. In general, when the person has a gun, or any other object that presents a substantial reflective presence, the component of vertically polarized energy which is reflected back from the object increases.

In general, the present invention relies on the physical phenomenon of reflection in which an incident beam of horizontal polarization will be partially reflected back as vertical polarization. The percentage of energy converted to vertical polarization depends on the shape of the weapon in the plane normal to the direction of incidence. If the weapon has a cross sectional shape which has both vertical and horizontal components, then a vertically polarized component will be realized even though the object is irradiated by horizontal polarization.

Outside the laboratory, the invention is capable of being implemented using a standard set of stored values that represent the signals which are reflected from persons who are not carrying concealed weapons. This data, which may be measured and compiled using a number of persons, would furnish the information represented in the upper graph shown in FIG. 10. In an advanced implementation of the invention, the detector is capable of adapting to its environment by progressively and continuously learning about the reflected signals that are produced by many persons entering the "Safe Zone™" who are not carrying weapons.

III. Laboratory Data

FIG. 11 is a viewgraph that offers test data regarding the detection of a handgun in accordance with the present invention using the 9.5 to 10.6 GHz frequency bands. However, this data is taken with a vertically polarized transmitter, which is not the preferred embodiment. This chart shows the received difference between a person carrying a gun and a person without a gun for horizontal polarization only. Data were taken for front, side and back views. Five of the six cases showed positive indication of a gun.

It was noted earlier that the difference in backscatter between a 0.357 hand gun and the human body was approximately −8 dB on the average. In arithmetic terms this means that the combined gun plus body signal will increase only 1.4 dB over the case without a gun. Given that the human body variance is on the order of ±3 dB, it is not hard to understand why a gun would be difficult to detect. The human body is elongated, and not surprisingly then, the cross section is higher for incident vertical polarization. The cross polarization derives from this higher level.

If incident horizontal polarization is used, the body cross section reduces by approximately 6 dB and the now vertically polarized cross polarization reduces a like amount. However, the cross polarization of a gun stays constant. This means that the 1.4 dB difference can now become 7.4 dB, on the average, and even the 3 dB variation in body response is not sufficient to overcome this improvement. Thus, the preferred embodiment is to transmit horizontal polarization, and to receive both horizontal and vertical polarization.

FIG. 12 supplies actual test data concerning the detection of a handgun at the 2.9 to 3.25 GHz frequency band. The incident polarization was horizontal. The margin or detection column shows a failure for a particular subject, Rokki, when the gun is viewed from the front. The criterion for failure is a margin below 0 dB. When the gun was located on the side there were no failures for any of the test cases. When the gun was located on the back, the subject George showed a −10.4 dB level and was ruled a failure.

FIGS. 13 and 14 are measured time domain test equipment plots of two pairs of waveforms generated during a handgun detection experiment. In FIG. 13, the person was not carrying a gun, and the maximum values of the two curves are far apart or 29.6 dB apart. The incident polarization is horizontal and thus the receive polarization for horizontal is greater than the receive polarization for vertical. In FIG. 14, the same person was carrying a handgun, and the distance between the high points of the two curves is now only 7.9 dB different, correctly indicating the presence of a gun.

FIGS. 15, 16 and 17 represent a summary of all measured front, side and back cases, respectively, in the 2.9 to 3.25 GHz band. In FIG. 15, the results from a history of eleven targets are summarized for both the main (horizontal) polarization, and the cross (vertical) polarization. The data are presented for both cases in which a gun is present and in which a gun is absent.

FIG. 15 contains four values of particular interest:

XG Cross-polarization level with a gun for a given measurement;

XNGave Average cross-polarization level with no gun;

NGD Difference between main and cross polarizations with no gun; and

NGDave Average of several NGD measurements.

The present invention uses averages for the main-cross no-gun case, and the cross no-gun case to make the determination whether or not a gun is present. This tends to eliminate the body variance effect which was discussed just previously. The following two rules are utilized in a preferred embodiment of the invention to determine the presence of a weapon and to indicate false alarms.

Rule A: If "XG−XNGave" is positive, then a gun is present.

If Test B, "XNG−XNGave," and Test C, "NGD−NGDave," are positive, then there is a false alarm.

FIG. 16 represents the case where the gun is located on the side of the body, and the side of the body is viewed. This case shows 100% detection of the gun and there is no false alarm rate. FIG. 17 represents the case where the gun is located on the back of the body, and back of the body is viewed. This figure shows one failure out of 12 but has no false alarm rate.

It was reasoned that the body cross section would stay more or less stable as the frequency increased, but the cross polarization of the gun would increase some what. FIG. 18 shows the results when the system was operated in the 9.5 to 10.6 GHz frequency band.

FIGS. 19 and 20 provide relative power versus azimuth angle plots for two 8 by 8 antenna arrays using two different frequency bands. FIGS. 21 and 22 supply operational parameters for the present invention for two different frequency bands and two different size antennas.

FIGS. 23 and 24 portray triangular waveforms that may be employed in an alternative embodiment of the invention to generate the required frequency domain waveform for detecting an object in the 2.9 to 3.25 and 9.55 to 10.66 GHz frequency bands.

IV. Improving Reliability

In general, one embodiment of the present invention may be used to detect objects by illuminating a target with horizontal polarization, and then receiving both main and cross polarization of said object. One of the most difficult issues in the gun detection scheme proposed by these teachings is the variance of the human body. All data shown to date used amplitude input only to convert from the measured frequency domain to the displayed time domain plots. It was reasoned that such variances would result in significant phase deviations across the measurement band for the human body but not for the gun. In a measured instance, using both amplitude and phase information, this proved to reduce the cross polarized signal without a gun by 11.5 dB. Such a margin improvement would not only insure that gun detection cases are more easily determined, it would also provide margin for spurious items such as keys, eye glasses, cell phones, etc. This occurs because one can now force Tests B and C to not only be positive but also greater than 6 dB while keeping the remaining margin for Rule A. A Complex Fast Fourier Transform (FFT) can accommodate both amplitude and phase data.

V. Novel Signal Processing for Enhanced Reliability

In a preferred embodiment of the invention, a Complex Fast Fourier Transform (FFT) Algorithm is employed to improve the sensitivity of detecting objects. A Fast Fourier Transform is a mathematical expression that is used to convert information about frequency to information about time. FIG. 1A is a graph which plots the intensity or amplitude A of a wave W along the vertical axis Y for an interval of time, which is measured along the horizontal axis X. One full period from A=0 to A and then to −A and back to 0 constitutes the wavelength, λ. Each wavelength has 360° of phase or 2π radians. If one wave is delayed relative to another, a phase difference occurs. For example, if a second wave begins were the first wave is at +A, the second wave is now −90° relative to the first wave.

The Fast Fourier Transforms which are utilized in a preferred embodiment of the invention are the tools which enable this conversion from the frequency domain to the time domain. Complex Fast Fourier Transforms, which are also used to implement a preferred embodiment of the invention, extend the capability of the detection apparatus to account for more complicated information about the radio waves that concern both the "phase" and amplitude of the transmitted and reflected waves.

Measuring the phase of the polarized waves reflected from a person who may be carrying a concealed weapon is important because the polarized waves reflected from a concealed weapon and the polarized waves reflected from a human body behave quite differently. In general, the reflections from a concealed weapon, while not constant, vary within a relatively confined range. In contrast, the reflections from a human body are chaotic. A preferred embodiment of the invention exploits this generalized phenomena by using signal processing methods to distinguish the relatively well-behaved signals from a concealed weapon from the generally unpredictable signals from a human body.

The parent Patent Application entitled Object Detection System discloses novel methods and apparatus for detecting concealed weapons. The inventions described in the previous Application utilize a time domain method in which the difference between the co-polarized and cross-polarized returns from a target area is used to determine if a weapon is present. This earlier method assumes the returns from the target area are of equal phase, and are correlated in time. In reality, they are not. The advantage of the Complex FFT approach is that it incorporates the phase information into the transformation. The result of the uncorrelated data is a reduction in the return from the human body, increasing system sensitivity and the ability of the invention to detect concealed weapons.

The returns from the human body are chaotic in both amplitude and phase, while the return from a concealed weapon is well-behaved. FIG. 25 is a plot of phase versus frequency for a 0.357 caliber pistol, and a sample of the return from a moving human body. The cross-pole return comprises signals from a human body and a weapon. The Complex FFT approach utilizes the phase information from the cross-pole return in the transform to the time domain. The result is a reduction in the return from the body because of its uncorrelated nature. This effect is seen in FIG. 26. The return from the 0.357 weapon correlates, and remains unchanged, as seen in FIG. 27. The result is that less cross-pole signal is returned from the human body, improving the ability to detect weapons.

The present invention incorporates the apparatus depicted in FIGS. 28 or 29 to measure phase of the returned cross-pole signal. In FIG. 28, the phase measurement is performed at the RF signal frequency and at the IF signal frequency in FIG. 29. In both block diagrams, a phase discriminator is used to measure the phase of the returned cross-pole signal.

Generalized depictions of two sample cross-pole amplitude and phase responses from a human body are presented in FIG. 30. This information is used in the Complex FFT that is employed in a preferred embodiment of the invention.

The waveforms in FIG. 30 can be defined as follows:

$$S(f) = A_{fil(f)} \times A_{(f)} e^{(2\pi ft + \delta(f))}$$

where:

$A_{fil(f)}$=Amplitude Response of Bandpass Filter in the frequency domain;

$A_{(f)}$=Amplitude Response of the Cross-pole Return in the frequency domain;

f=Frequency in Gigahertz;

t=Time in nanoseconds; and $P_{(f)}=\delta(f)$=Phase Response of the Cross-pole Return in the frequency domain.

The frequency band of interest is broken into segments or bins. The number of bins "N" can be any practical value, from zero to a number approaching infinity. The proper value for "N" is dependent on the variance of the data. In this embodiment, N=21, and is used for illustrative purposes only.

$$S(t) = \sum_{N=1}^{N=21} A_{fil(f)} \times A_{(f)} e^{j(2\pi N \Delta ft + \delta(f))} \text{ where: } \Delta f = \frac{f_2 - f_1}{N-1},$$

$f_2$=upper frequency limit (GHz);

$f_1$=lower frequency limit (GHz); and

N=21.

For simplicity, $\delta(f)$ will be normalized to the values in the target region (i.e., target values at t=0). $A_{fil(f)}$ is not germane to this illustration, and will be dropped from the expression. The new expression can be defined as follows:

$$S(t) = A_0 + \sum_{n=1}^{n=10} A_{(n,\Delta f)} e^{j(2\pi n \Delta ft + (\delta - \delta_0))} +$$

$$\sum_{n=12}^{n=21} A_{(n,\Delta f)} e^{j(2\pi (n-11) \Delta ft + (\delta - \delta_0))}$$

where:

n=Incremental values of "N";

$\delta_o$=Reference phase value at center frequency (radians);

$\delta$=Phase at n$\Delta$f (radians); and $A_0$=Amplitude Response at the Center Frequency.

System Operation flowcharts are presented in FIGS. 31 and 32. The flowcharts describe the step-by-step operation of a preferred embodiment of the invention during normal operation and then during an initial calibration process.

VI. Alternative Embodiments & Applications

Although a preferred embodiment of the invention has been described in the context of detecting concealed handguns, the present invention may be employed to detect any number of objects. Since most knives have cross-pieces immediately below the blade, the invention may also be used to sense knives. The system may also be employed as a bomb or explosive detection device.

One embodiment of the present invention offers the additional benefits of being lightweight, portable and battery-operated. One version of the system may be constructed as a hand-carried unit that could be used by law enforcement officers during traffic stops to determine if the occupant of an automobile is armed. The invention may also be incorporated into automatic door-opening equipment.

The invention is not limited to finding weapons. In an alternative embodiment, the invention may locate distinctly shaped merchandise, or inexpensive tags attached to merchandise as an inventory control and anti-shoplifting system.

CONCLUSION

Although the present invention has been described in detail with reference to a particular preferred and alternative embodiments of the invention, persons possessing ordinary skill in the art to which this invention pertains will appreciate that various modifications and enhancements may be made without departing from the spirit and scope of the claims that follow. The circuit components that have been disclosed above are intended to educate the reader about particular preferred and alternative embodiments, and are not intended to constrain the limits of the invention or the scope of the claims. Although the preferred embodiments have been described with particular emphasis on specific hardware configurations or frequency bands, the present invention may be implemented using a variety of circuit components or frequency ranges. Although specific signal processing methods and apparatus have been described with particular emphasis on Complex Fast Fourier Transforms, the alternative embodiments of the present invention may also be implemented using a variety of other mathematical methods.

---

LIST OF REFERENCE CHARACTERS

10 Schematic block diagram of one embodiment of the invention
12 Transmitter
14 Modulator
16 Filter
18 Transmit amplifier
20 Transmit/receive switch
21 Range gate control
22 Pre-selector filter
24 Antenna
26 Processor
28 Local oscillator/Ramp generator with start/stop/slope programming
30 Local oscillator/Voltage controlled oscillator
32 Mixer
34 Receiver/Low noise amplifier
36 Filter
38 Automatic gain control/Gain programming digital-to-analog converter
40 Range gate switch
42 Band pass filter
44 Intermediate frequency, gain control amplifier
46 Detector
48 Video amplifier
50 Gated sample and hold stretcher
52 Output amplifier
54 Analog-to-digital converter
56 Transmit/receive switch
58 Repeat of Block A

---

What is claimed is:

1. A method of detecting an object, the method comprising the steps of:

illuminating a target person with horizontally polarized radiation;

collecting radiation reflected from said target which has a polarization which is the same as the radiation used to illuminate said target;

collecting radiation reflected from said target which has a polarization that is orthogonal to that of said radiation which is used to illuminate said target;

calculating a difference between a collected radiation level of radiation reflected from said target which has a polarization that is orthogonal to that of said radiation which is used to illuminate said target and a predetermined average radiation level, which, if positive, indicates that the object is present; and calculating one or more differences between collected radiation levels and predetermined average radiation levels, which, if positive, indicates that there is a false alarm.

2. The method of claim 1 wherein calculating one or more differences comprises calculating a difference between: (1) a difference between a collected radiation level of radiation reflected from said target which has a polarization which is the same as the radiation used to illuminate said target and the collected radiation level of radiation reflected from said target which has a polarization that is orthogonal to that of said radiation which is used to illuminate said target and (2) a predetermined average difference.

3. The method of claim 2 wherein calculating one or more differences comprises calculating a difference between a collected radiation level of radiation reflected from said target which has a polarization that is orthogonal to that of said radiation which is used to illuminate said target and a predetermined average radiation level.

4. The method of claim 1 wherein the step of calculating a difference comprises calculating a difference which, if positive, indicates that a weapon is present.

5. The method of claim 4 wherein the step of calculating a difference comprises calculating a difference which, if positive, indicates that a gun is present.

6. The method of claim 1 wherein in the calculating steps the predetermined average radiation levels are learned dynamically based upon collected radiation levels from a plurality of target persons not carrying the object.

7. The method of claim 1 wherein the step of illuminating a target person with horizontally polarized radiation comprises illuminating a target with horizontally polarized radiation in a band selected from the group consisting of a 2.9 to 3.25 GHz band and a 9.5 to 10.6 GHz band.

8. The method of claim 1 additionally comprising the step of performing prior to the calculating steps a Complex Fast Fourier Transform from a frequency domain to a time domain utilizing phase information from cross-polarized radiation return from said target.

9. The method of claim 1 wherein the step of illuminating a target person with horizontally polarized radiation comprises illuminating both a front or back and a side of said target.

10. The method of claim 1 wherein the step of illuminating a target person with horizontally polarized radiation comprises illuminating with radiation comprising a plurality of rounded triangular waveforms.

11. An apparatus for detecting an object, said apparatus comprising:

means for illuminating a target person with horizontally polarized radiation;

means for collecting radiation reflected from said target which has a polarization which is the same as said radiation used to illuminate said target;

means for collecting radiation reflected from said target which has a polarization that is orthogonal to that of said radiation which is used to illuminate said target;

means for calculating a difference between a collected radiation level of radiation reflected from said target which has a polarization that is orthogonal to that of said radiation which is used to illuminate said target and a predetermined average radiation level, which, if positive, indicates that a weapon is present; and means for calculating one or more differences between collected radiation levels and predetermined average radiation levels, which, if positive, indicates that there is a false alarm.

12. The apparatus of claim 11 wherein said means for calculating one or more radiation level differences comprises means for calculating a difference between: (1) a difference between a collected radiation level of radiation reflected from said target which has a polarization which is the same as the radiation used to illuminate said target and the collected radiation level of radiation reflected from said target which has a polarization that is orthogonal to that of said radiation which is used to illuminate said target and (2) a predetermined average difference.

13. The apparatus of claim 12 wherein said means for calculating one or more radiation level differences comprises means for calculating a difference between a collected radiation level of radiation reflected from said target which has a polarization that is orthogonal to that of said radiation which is used to illuminate said target and a predetermined average radiation level.

14. The apparatus of claim 12 wherein said means for calculating a difference comprises means for calculating a difference which, if positive, indicates that a weapon is present.

15. The apparatus of claim 14 wherein said means for calculating a difference comprises means for calculating a difference which, if positive, indicates that a gun is present.

16. The apparatus of claim 11 wherein additionally comprising mean for dynamically learning said predetermined average radiation levels based upon collected radiation levels from a plurality of target persons not carrying the object.

17. The method of claim 11 wherein the step of illuminating a target with horizontally polarized radiation comprises illuminating a target person with horizontally polarized radiation in a band selected from the group consisting of a 2.9 to 3.25 GHz band and a 9.5 to 10.6 GHz band.

18. The method of claim 11 additionally comprising the step of performing prior to the calculating steps a Complex Fast Fourier Transform from a frequency domain to a time domain utilizing phase information from cross-polarized radiation return from said target.

19. The method of claim 11 wherein the step of illuminating a target with horizontally polarized radiation comprises illuminating both a front or back and a side of said target.

20. The method of claim 11 wherein the step of illuminating a target person with horizontally polarized radiation comprises illuminating with radiation comprising a plurality of rounded triangular waveforms.

* * * * *

UNITED STATES PATENT AND TRADEMARK OFFICE
CERTIFICATE OF CORRECTION

PATENT NO. : 6,243,036 B1
DATED : June 5, 2001
INVENTOR(S) : George G. Chadwick et al.

Page 1 of 1

It is certified that error appears in the above-identified patent and that said Letters Patent is hereby corrected as shown below:

Column 14, claim 16,
Line 37, please delete the word "wherein".
Line 38, please replace the word "mean" with the word -- means --.

Signed and Sealed this

Ninth Day of April, 2002

Attest:

JAMES E. ROGAN
Attesting Officer    Director of the United States Patent and Trademark Office